US006035131A

United States Patent [19]
Washisu

[11] Patent Number: 6,035,131
[45] Date of Patent: *Mar. 7, 2000

[54] IMAGE BLUR PREVENTION APPARATUS AND A CONTACT PORTION FOR CONTACTING FIXED PORTIONS OF A MOVABLE OPTICAL MEMBER FOR AN IMAGE BLUR PREVENTION APPARATUS WHICH PREVENTS IMAGE BLUR BY MOVING THE MOVABLE OPTICAL MEMBER

[75] Inventor: Koichi Washisu, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/683,951

[22] Filed: Jul. 19, 1996

[30] Foreign Application Priority Data

Jul. 21, 1995 [JP] Japan .................................. 7-206768
Jul. 21, 1995 [JP] Japan .................................. 7-206769

[51] Int. Cl.⁷ .................................................. G03B 17/00
[52] U.S. Cl. .............................................................. 396/55
[58] Field of Search .................................. 396/52, 55, 53, 396/54; 348/208; 359/554

[56] References Cited

U.S. PATENT DOCUMENTS

| | | | |
|---|---|---|---|
| 4,869,108 | 9/1989 | Washisu | 73/517 B |
| 4,965,619 | 10/1990 | Shikaumi et al. | 354/410 |
| 5,020,369 | 6/1991 | Washisu et al. | 73/517 A |
| 5,041,852 | 8/1991 | Misawa et al. | 354/76 |
| 5,153,633 | 10/1992 | Otani | 354/430 |
| 5,266,988 | 11/1993 | Washisu | 396/55 |
| 5,463,443 | 10/1995 | Tanaka et al. | 354/430 |
| 5,559,571 | 9/1996 | Miyamoto et al. | 354/286 |
| 5,583,597 | 12/1996 | Enomoto | 396/55 |
| 5,619,735 | 4/1997 | Kai | 396/55 |
| 5,633,756 | 5/1997 | Kaneda et al. | 359/554 |
| 5,652,919 | 7/1997 | Itoh | 396/33 |
| 5,655,158 | 8/1997 | Kai | 396/55 |
| 5,659,806 | 8/1997 | Miyamoto et al. | 396/54 |
| 5,680,251 | 10/1997 | Kato et al. | 359/557 |

*Primary Examiner*—Safet Metjahic
*Assistant Examiner*—Christopher E. Mahoney
*Attorney, Agent, or Firm*—Fitzpatrick, Cella, Harper & Scinto

[57] ABSTRACT

An image blur prevention apparatus, includes a correction optical system for preventing an image blur a lock member for locking the correction optical system which sets the collection optical system immobile, and an operation portion which prevents optical system movement by operating the lock member. It prevents the correction optical system from rotational displacement due to its weight about a fulcrum at the contact position with the lock member, by always urging the correction optical system against the sliding surface in the direction of the rotational displacement. This is arranged by the foregoing structure to keep the state of the image blur prevention apparatus properly (so as to keep the optical axis of the correction optical system from inclining) during the period in which the operation of the correction optical system is regulated.

24 Claims, 23 Drawing Sheets

<A FIGURE SEEN FROM A DIRECTION OF 79C IN FIG. 4A>

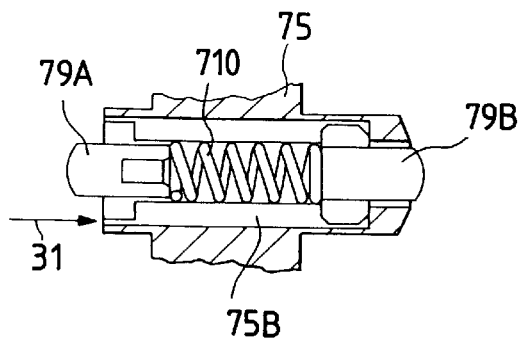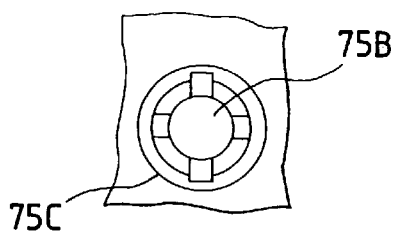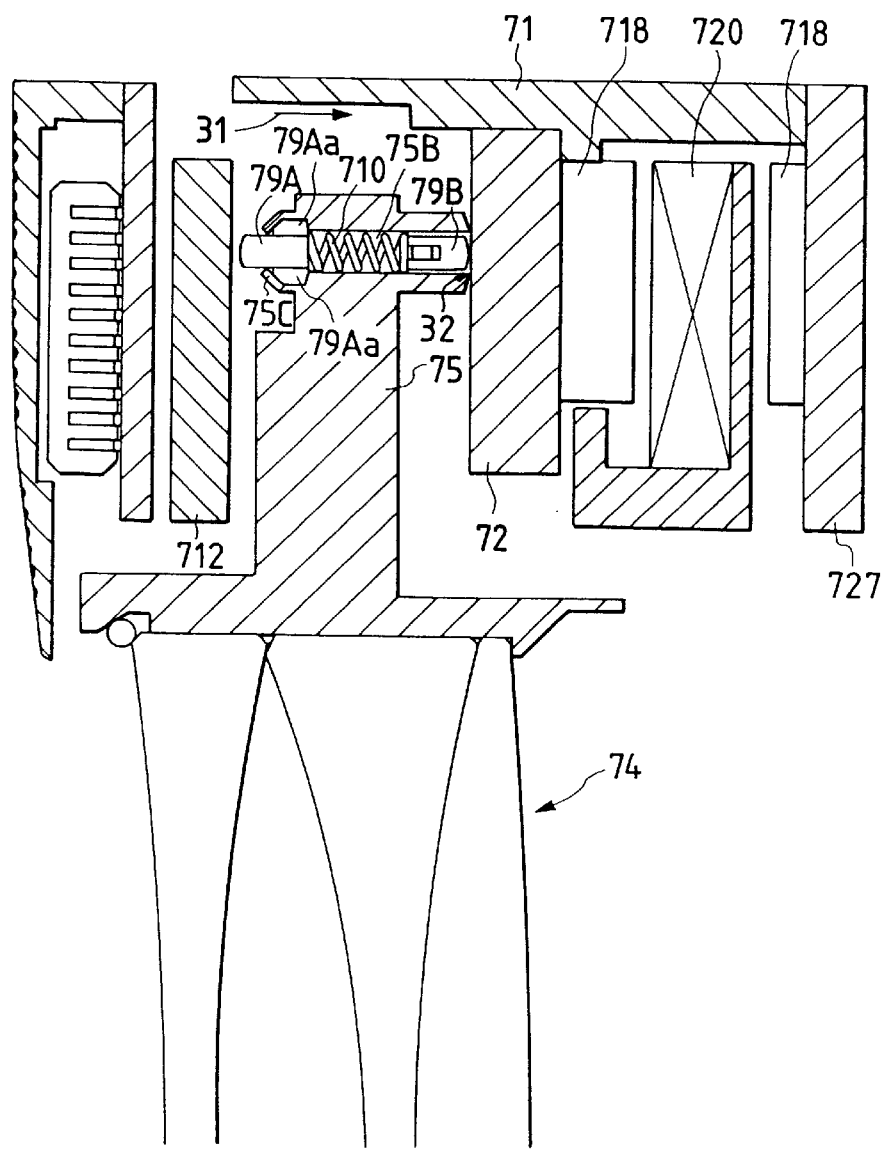

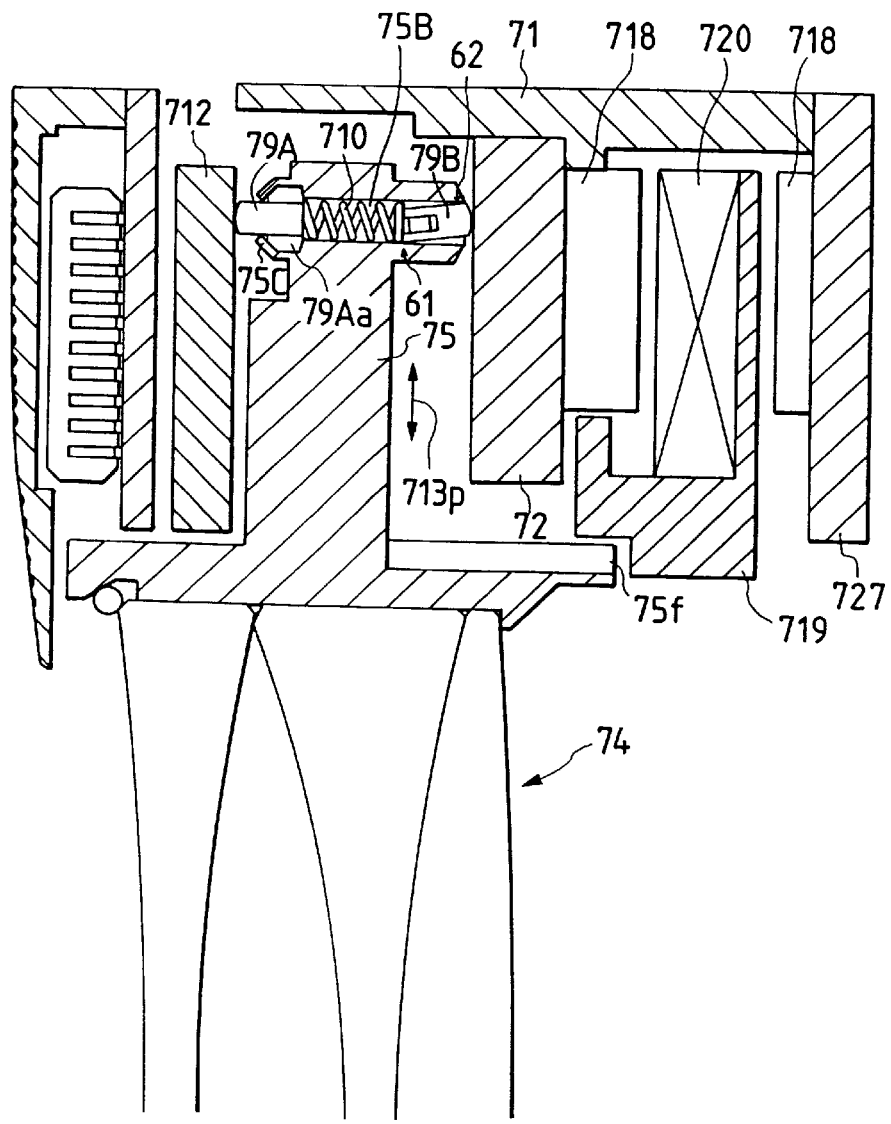
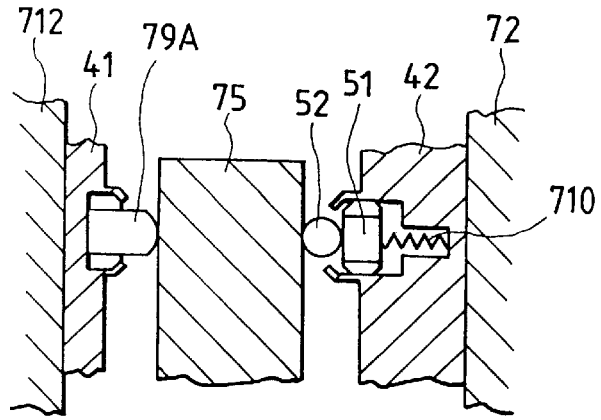

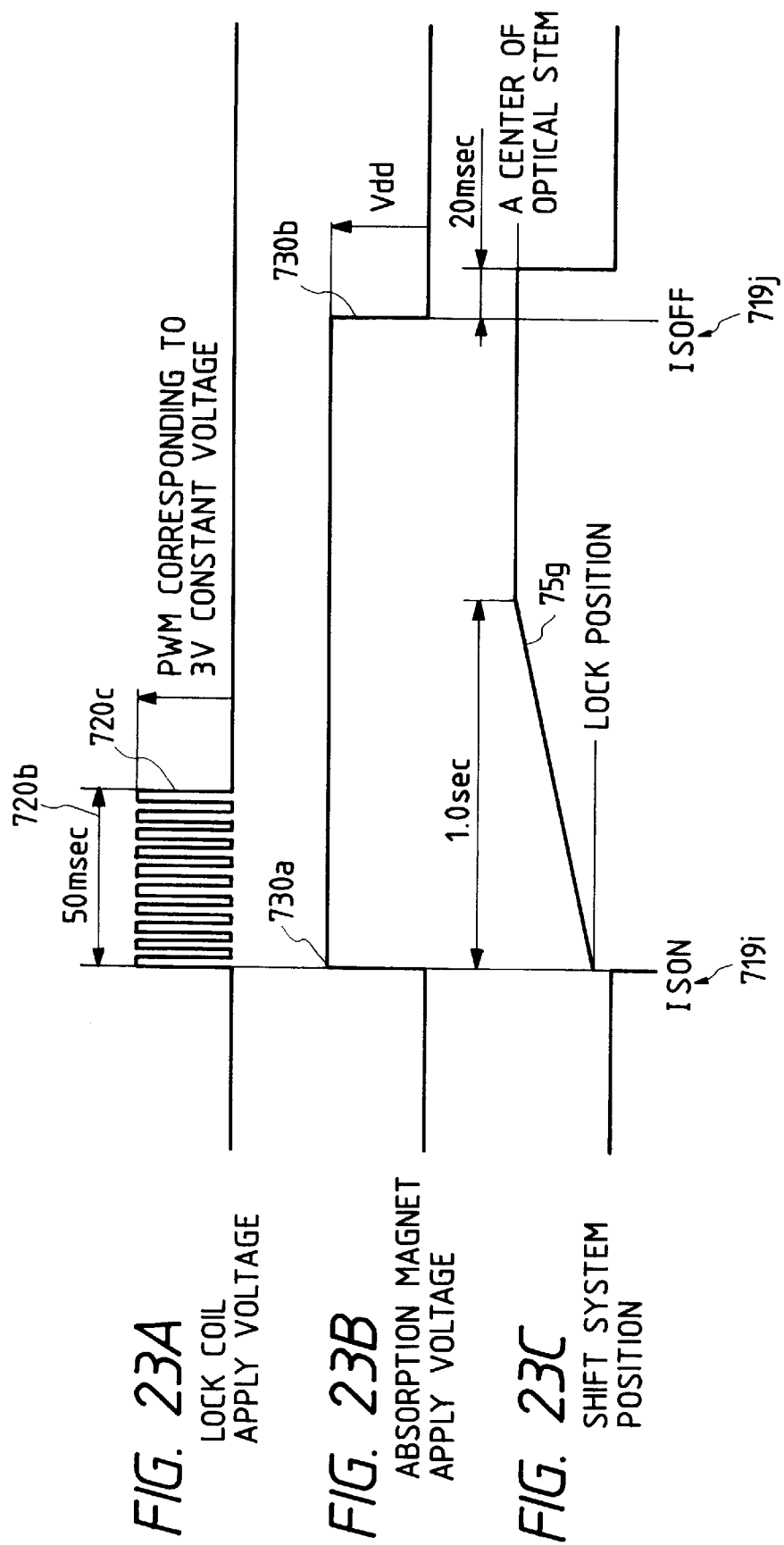

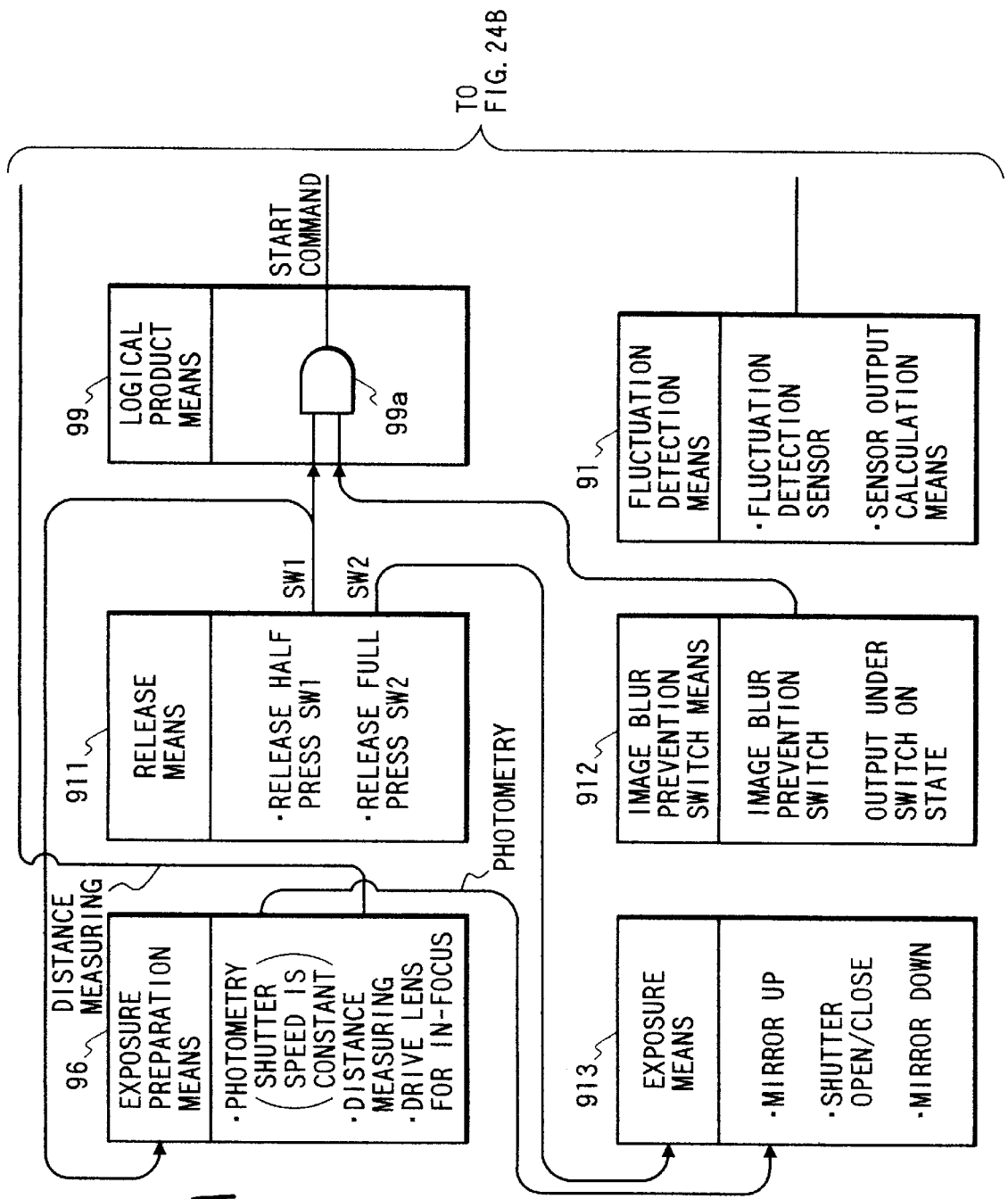

IMAGE BLUR PREVENTION APPARATUS AND A CONTACT PORTION FOR CONTACTING FIXED PORTIONS OF A MOVABLE OPTICAL MEMBER FOR AN IMAGE BLUR PREVENTION APPARATUS WHICH PREVENTS IMAGE BLUR BY MOVING THE MOVABLE OPTICAL MEMBER

BACKGROUND OF THE INVENTION

1. Field of the Invention

The present invention relates to an image blur prevention apparatus for preventing an image blur from occurring in cameras, optical equipment, and so on.

2. Related Background Art

Since recent cameras are automated as to all operations important for photography, including the determination of exposure, focusing, and the like, the possibility of causing faulty photography is very low even for people lacking in camera operational skills.

Systems for preventing hand vibration (fluctuation) from being transferred to the camera have been researched these years, and there now remains only a few factors which induce faulty photography.

In the following, a system for preventing hand vibration will be explained briefly.

The hand vibration experienced by a camera upon photography normally includes the fluctuation at frequencies of 1 Hz to 12 Hz, and the basic idea for enabling one to take a photograph without image blur even with such hand vibration occurring at a shutter release point is to detect the fluctuation of the camera due to the above hand vibration and to displace a correction lens in accordance with a value thus detected. In order to achieve the taking of a photograph without an image blur even where camera fluctuation occurs, it is thus necessary, first, to accurately detect the fluctuation of the camera and, second, to correct a change of the optical axis due to the hand vibration.

Fundamentally speaking, the detection of vibration (camera fluctuation) can be conducted by equipping the camera with a vibration detecting means for detecting an angular acceleration, an angular velocity, an angular displacement, or the like and a camera fluctuation detecting means for electrically or mechanically integrating an output signal from the foregoing sensor to output an angular displacement. Then the image blur can be suppressed by driving a correction optical mechanism for deviating the photographic optical axis, based on the detection information.

Now, an image blur prevention system using the vibration detecting means is schematically explained referring to FIG. 14.

The example of FIG. 14 is an illustration of a system for controlling the image blur originating from vertical fluctuation 81p and horizontal fluctuation 81y of a camera in the directions of arrows 81, as shown.

In the drawing, reference numeral 82 designates a lens barrel, and 83p, 83y donote vibration detecting means for detecting the camera vertical fluctuation and camera horizontal fluctuation, respectively, the directions of fluctuation detection of which are represented by 84p, 84y, respectively. Numeral 85 denotes a correction (optical) means (wherein 85p, 85y are coils for giving thrust to the correction means 85 and 86p, 86y are position detecting elements for detecting the position of the correction means 85), and the correction means 85 is provided with a position control loop described later to be driven using outputs from the vibration detecting means 83p, 83y as target values, thereby securing stability at the image plane 88.

FIG. 15 is an exploded perspective view to show the structure of the correction means suitably used for the above purpose, and this structure will be explained also referring to FIG. 16 to FIG. 23.

Back projection ears 71a [at three positions (one of which is on the blind side)] of a base plate 71 (an enlarged view of which is shown in FIG. 17) are brought into fit with the unrepresented barrel and conventional barrel rollers or the like are screwed to holes 71b, thereby fixing the base plate to the barrel.

A second yoke 72 being a magnetic member and covered with bright deposits is screwed to holes 71c of the base plate 71 by screws penetrating holes 72a. Further, permanent magnets (magnets for shift) 73 such as neodymium magnets magnetically adsorb to the second yoke 72. The directions of magnetization of the respective permanent magnets 73 are the directions of arrows 73a illustrated in FIG. 15.

Coils 76p, 76y (coils for shift) are in snap-fit adhesion (which means a state of adhesion after forcibly pushed into) to a support frame 75 (an enlarged view of which is shown in FIG. 18) to which a lens 74 is fixed through a C-ring or the like (though FIG. 18 shows a state before adhesion of the coils), and light projecting elements 77p, 77y, such as IREDs, are also bonded to the back face of the support frame 75. Light emitted from the light projecting element passes through a slit 75ap, 75ay to be incident on a position detecting element 78p, 78y, such as a PSD described hereinafter.

FIG. 16 is a lateral sectional view of the correction means after being assembled, and assembling of the correction means is next explained referring to the drawing.

Support balls 79b (at three positions) of a ball bearing or the like are temporarily set in holes 75b' of the support frame 75 by applying, for example, fluorine-based grease thereto. In this state, returning to FIG. 15, one end of an L-shaped shaft 711 (of a non-magnetic stainless steel material) is inserted, after coated with grease, into a bearing portion 75d of the support frame 75 and the other end is inserted into a bearing portion 71d (similarly coated with grease) formed in the base plate 71. Then, all support balls 79b at three positions are mounted on the second yoke 72 so as to set the support frame 75 in the base plate 71.

After that, charge springs 710, and support balls 79a of the ball bearing or the like are incorporated in order into the holes 75b of the support frame 75.

Next, for example, the fluorine-based grease is applied to the bearing portion 75d of the support frame 75, the L-shaped shaft 711 (of the non-magnetic stainless steel material) is inserted there (see FIG. 15), and the other end of the L-shaped shaft 711 is inserted into the bearing portion 71d (after similarly coated with the grease) formed in the base plate 71.

Then, positioning holes 712a (at three positions) of a first yoke 712 shown in FIG. 15 are brought into fit on pins 71f (at three positions) of the base plate 71 shown in FIG. 17, and receiving facets 71e (at five positions) also shown in FIG. 17 catch the first yoke 712 so as to magnetically couple it with the base plate 71 (by the magnetic force of the permanent magnets 73).

This makes the back face of the first yoke 712 go into contact with the support balls 79a and makes the support frame 75 sandwiched between the first yoke 712 and the second yoke 72, as shown in FIG. 16, to effect positioning in the direction of the optical axis.

The fluorine-based grease is also applied to the mutual contact faces between the support balls 79a, 79b and the first yoke 712 or the second yoke 72, and the support frame 75 is freely slidable within the plane perpendicular to the optical axis with respect to the base plate 71.

The charge springs 710 are charged against the first yoke 712, so that the lens 74 is biased toward the second yoke 72 to be stabilized in position.

The above L-shaped shaft 711 supports the support frame 75 so that it can slide only in the directions of arrows 713p, 713y with respect to the base plate 71, thereby regulating relative rotation (rolling) of the support frame 75 about the optical axis with respect to the base plate 71.

Fitting play between the above L-shaped shaft 711 and the bearing portions 71d, 75d is set rather great in the optical-axis direction, thereby preventing duplex fitting against the regulation in the optical-axis direction by pinching with the support balls 79a, 79b, the first yoke 712, and the second yoke 72.

The surface of the first yoke 712 is covered by an insulation-purpose sheet 714 and a hard board 715 having a plurality of ICs (the position detecting elements 78p, 78y, output amplifying ICs, ICs for driving the coils 76p, 76y, etc.) is set thereon so that positioning holes 715a (at two positions) are fit on pins 71h (at two positions) of the base plate 71 shown in FIG. 17. Then holes 715b are screwed together with the holes 712b of the first yoke 712 into the holes 71g of the base plate 71.

Here, the position detecting elements 78p, 78y are positioned with a tool and soldered on the hard board 715, and a flexible board 716 for transmission of signal is also fixed so that a surface 716a thereof is press-welded by heat to a range 715c (see FIG. 15) surrounded by the dashed line in the back face of the hard board 715.

A pair of arms 716bp, 716by project out in directions on the plane perpendicular to the optical axis from the flexible board 716 to be hooked on hook portions 75ep, 75ey (see FIG. 18), respectively, of the support frame 75, and the terminals of the light projecting elements 77p, 77y and the terminals of the coils 76p, 76y are soldered thereto.

By this arrangement, the driving of the light projecting elements 77p, 77y such as IREDs and the coils 76p, 76y is executed by the hard board 715 through the flexible board 716.

The arms 716bp, 716by (see FIG. 15) of the above flexible board 716 have respective bending portions 716cp, 716cy and the elasticity of the bending portions decreases loads of the arms 716bp, 716by on the motion of the support frame 75 in the plane perpendicular to the optical axis.

The first yoke 712 has projecting surfaces 712c formed by stamping, and the projecting surfaces 712c are in direct contact with the hard board 715 through holes 714a of the insulating sheet 714. A ground pattern is formed on the side of the hard board 715 in this contact surface, so that the first yoke 712 is a rounded by screwing the hard board 715 to the base plate, thereby preventing them from being an antenna and thus adding noise to the hard board 715.

A mask 717 shown in FIG. 15 is positioned by pins 71h of the base plate 71 and fixed on the hard board 715 by double-sided tape.

A through hole 71i a for permanent magnet (see FIG. 15 and FIG. 17) is formed through the base plate 71 and the back face of the second yoke 72 is exposed through the through hole. A permanent magnet 718 (magnet for lock) is incorporated in this through hole 71i to be magnetically coupled with the second yoke 72 (see FIG. 16).

A coil 720 (coil for lock) is bonded to a lock ring 719 (see FIG. 15, FIG. 16, and FIG. 19). Further, a bearing 719b (see FIG. 20) is located on the back face of an ear 719a of the lock ring 719, and an armature pin 721 (see FIG. 15) is put through an armature rubber 722 and then the armature pin 721 is set through the bearing 719b. After that, an armature spring 723 is put over the armature pin 721 and the pin is fit into an armature 724 to be fixed by calking.

Therefore, the armature 724 can slide in the directions of arrows 725 relative to the lock ring 719 against charge force of the armature spring 723.

FIG. 20 is a plan view of the correction means after completion of assembling, seen from the back side of FIG. 15. In this figure, the lock ring 719 is mounted to the base plate 71 by such conventional bayonet coupling that the lock ring 719 is pushed into the base plate 71 while keeping outer cut portions 719c (at three positions) of the lock ring 719 matched with inner projections 71j (at three positions) of the base plate 71 and thereafter the lock ring is rotated clockwise to effect locking.

Therefore, the lock ring 719 is rotatable about the optical axis with respect to the base plate 71. In order to prevent disengagement of the bayonet coupling with such rotation of the lock ring 719 as to make the cuts 719c again aligned in the same phase with the projections 71j, a lock rubber 726 (see FIG. 15 and FIG. 20) is pushed into the base plate 71, whereby rotation of the lock ring 719 is regulated so that the lock ring 719 can rotate only in the range of angle θ (see FIG. 20) of a cut portion 719d regulated by the lock rubber 726.

A permanent magnet 718 (magnet for lock) is attached also to a yoke 727 (see FIG. 15) of a magnetic member. Holes 727a (at two positions) of the yoke 727 are fit on pins 71k (see FIG. 20) of the base plate 71, and the yoke 727 and the base plate 71 are screwed through holes 727b (at two positions) and 71n (at two positions).

A well known closed magnetic circuit is formed by the permanent magnet 718 on the base plate 71 side, the permanent magnet 718 on the locking yoke 727 side, and the second yoke 72 and locking yoke 727.

Further, the above lock rubber 726 is prevented from slipping off by screwing of the locking yoke 727. The locking yoke 727 is not illustrated in FIG. 20, for the above explanation.

A lock spring 728 is hooked on between a hook 719e of the lock ring 719 and a hook 71m of the base plate 71 (see FIG. 20), thereby energizing the lock ring 719 clockwise. An adsorption coil 730 is put onto an adsorption yoke 729 (see FIG. 15 and FIG. 20) and is screwed through a hole 729a of the base plate 71.

The terminals of coil 720 and the terminals of adsorption coil 730 are arranged in a twisted pair structure of polyester-coated lines of four-wire strands to be soldered to a trunk 716d of the flexible board 716.

ICs 731p, 731y on the hard board 715 are ICs for amplifying outputs from the position detecting elements 78p, 78y, respectively, and the internal structure thereof is as shown in FIG. 21 (wherein only 731p is shown because the ICs 731p, 731y are constructed in the same structure).

In FIG. 21, current-voltage conversion amplifiers 731ap, 731bp convert photocurrents $78i_1p$, $78i_2p$, occurring in the position detecting element 78p (consisting of resistors R1, R2) because of the light projecting element 77p, into voltages and a differential amplifier 731cp obtains a difference output between the outputs from the current-voltage conversion amplifiers 731ap, 731bp to amplify it.

The light emitted from the light projecting element 77p, 77y is incident through the slit 75ap, 75ay onto the position detecting element 78p, 78y, as described previously, and the position of incidence onto the position detection element 78p, 78y changes when the support frame 75 moves in the plane perpendicular to the optical axis.

The position detecting element 78p has a sensitivity in the directions of arrows 78ap (see FIG. 15) and the slit 75ap is shaped so as to expand a beam in the directions (directions 78ay) perpendicular to the arrows 78ap and to converge the beam in the directions of arrows 78ap. Thus, a balance between the photocurrents $78i_1p$, $78i_2p$ of the position detecting element 78p changes only when the support frame 75 moves in the directions of arrows 713p, and the differential amplifier 731cp gives an output depending upon movement of the support frame 75 in the directions of arrows 713p.

Further, the position detecting element 78y has its detection sensitivity in the directions of arrows 78ay (see FIG. 15), and the slit 75ay is shaped so as to extend in the directions (directions 78ap) perpendicular to the arrows 78ay. Thus, the position detecting element 78y changes its output only when the support frame 75 moves in the directions of arrows 713y.

A summing amplifier 731dp obtains the sum (the sum of quantities of received light by the position detecting element 78p) of the outputs from the current-voltage conversion amplifiers 731ap, 731bp, and a driving amplifier 731ep receiving this signal drives the light projecting element 77p according thereto.

The quantity of projected light from the light projecting element 77p changes on a very unstable basis depending upon the temperature or the like, and with the change an absolute quantity ($78i_1p+78i_2p$) of the photocurrents $78i_1p$, $78i_2p$ of the position detecting element 78p changes. Because of this, the output from the differential amplifier 731cp, ($78i_1p-78i_2p$), indicating the position of the support frame 75, also changes.

However, the change of the output from the differential amplifier 731cp can be suppressed by controlling the light projecting element 77p by the aforementioned driving circuit so as to keep the sum of the quantities of received light constant as described above.

The coils 76p, 76y shown in FIG. 15 are located inside the closed magnetic circuit formed by the permanent magnets 73, first yoke 712, and second yoke 72. Thus, the support frame 75 is driven in the directions of arrows 713p (according to the Fleming's left-hand rule) with the flow of current through the coil 76p, and the support frame 75 is driven in the directions of arrows 713y with the flow of current through the coil 76y.

Generally, when the outputs from the position detecting elements 78p, 78y are amplified by the ICs 731p, 731y and the coils 76p, 76y are driven by outputs therefrom, the support frame 75 is driven to change the outputs from the position detecting elements 78p, 78y.

Here, when the driving directions (the polarities) of the coils 76p, 76y are set in such directions as to decrease the outputs from the position detecting elements 78p, 78y (in the negative feedback), the support frame 75 is stabilized at the position where the outputs from the position detecting elements 78p, 78y become nearly zero by the driving force of the coils 76p, 76y.

This driving technique, by negative feedback of position detection outputs, is called as a position control technique, and, for example, if target values (for example, hand-vibration angle signals) are mixed into the ICs 731p, 731y from the outside, the support frame 75 can be driven very loyally according to the target values.

In actual arrangement, the outputs from the differential amplifiers 731cp, 731cy are sent through the flexible board 716 to the main board not shown, in which analog-to-digital conversion (A/D conversion) is carried out. The results are taken into a microcomputer.

In the microcomputer the input signals are compared suitably with the target values (hand-vibration angle signals) to be amplified, phase lead compensation (for stabilizing the position control more) is effected by the conventional digital filter technique, and thereafter the signals are again input through the flexible board 716 to IC 732 (for driving the coils 76p, 76y). The IC 732 performs the well-known PWM (pulse-width modulation) drive of the coils 76p, 76y, based on the signals input thereto, thereby driving the support frame 75.

The support frame 75 can slide in the directions of arrows 713p, 713y as described previously, and is stabilized in position by the position control technique discussed above. However, for consumer-oriented optical devices including cameras, it is not allowed to always control the support frame 75 from the viewpoint of preventing waste consumption of power.

Since the support frame 75 becomes free to move in the plane perpendicular to the optical axis during a non-controlled state, it is necessary to provide a countermeasure against generation of colliding sound or damage at the stroke ends during that state.

As shown in FIG. 18 and FIG. 20, projections 75f radially projecting are provided at three positions on the back face of the support frame 75, and the tips of projections 75f are fit to the inner peripheral surface 719g of the lock ring 719 as shown in FIG. 20. Therefore, the support frame 75 is restrained in the all directions relative to the base plate 71.

FIGS. 22A and 22B are plan views to show the relation between the lock ring 719 and the operation of the support frame 75, which are drawings obtained by extracting only the major part from the plan view of FIG. 20. For making the explanation easier to understand, the layout is changed a bit from the actually assembled state. Further, cams 719f (at three positions) shown in FIG. 22A are not formed throughout the entire region in the direction of the generatrix of the cylinder of the lock ring 719, as shown in FIG. 16 and FIG. 19, and they are not seen actually along the viewing direction of FIGS. 22A, 22B. However, they are illustrated for explanation's sake.

As shown in FIG. 16, the coil 720 (where 720a denotes lead lines of four-wire strands guided around the outer periphery of the lock ring 719 by a flexible board or the not shown, and connected to the terminals 716e on the trunk 716d of the flexible board 716 from the terminals 719h) is set in the closed magnetic circuit between the permanent magnets 718, and generates torque for rotating the lock ring 719 about the optical axis when the current is supplied to the coil 720.

The drive of this coil 720 is also controlled by a command signal supplied from the unrepresented microcomputer through the flexible board 716 to the driving IC 733 on the hard board 715, and the IC 733 PWM-drives the coil 720.

In FIG. 22A the winding direction of the coil 720 is set so as to generate a counterclockwise torque in the lock ring 719 upon energization of coil 720, whereby the lock ring 719 rotates counterclockwise against the spring force of the lock spring 728.

Before energization of the coil 720, the lock ring 719 is stable in contact with the lock rubber 726 under the force of the lock spring 728.

With rotation of the lock ring 719, the armature 724 goes into contact with the adsorption yoke 729 as contracting the armature spring 723 so as to equalize the positional relation between the adsorption yoke 729 and the armature 724, whereby the lock ring 719 stops rotating as shown in FIG. 22B.

FIGS. 23A to 23C are timing charts of drive of the lock ring.

The coil 720 is energized (by the PWM drive indicated at 720*b*) at the arrow 719*i* of FIGS. 23A, and at the same time, the adsorption magnet 730 is also energized (at 730*a*). This causes the armature 724 to go into contact with the adsorption yoke 729 and to be equalized thereto and at that point the armature 724 is adsorbed to the adsorption yoke 729.

Next, when the energization of the coil 720 is stopped at the point indicated at 720*c* in FIGS. 23A to 23C, the lock ring 719 becomes about to rotate clockwise by the force of the lock spring 728. However, because the armature 724 is adsorbed to the adsorption yoke 729 as described above, the rotation is restrained. Since at this time the projections 75*f* of the support frame 75 are present at positions opposed to the associated cams 719*f*, the support frame 75 becomes capable of moving by a clearance between the projection 75*f* and the cam 719*f*.

This could cause the support frame 75 to drop in the direction of gravity G (see FIG. 22B), but the support frame 75 is also brought into the controlled state at the point of arrow 719*i* in FIGS. 23A to 23C, which prevents the support frame 75 from dropping.

In the non-controlled state the support frame 75 is restrained by the inner periphery of the lock ring 719, but it actually has play corresponding to the fitting play between the projections 75*f* and the inner peripheral wall 719*g*. Namely, the support frame 75 drops by this play in the direction of gravity G, so that there is an offset between the center of the support frame 75 and the center of the base plate 71.

Because of this control is carried out so as to move the support frame 75 to the center of the base plate 71 slowly, for example, during a period of one second from the point of the arrow 719*i*.

This is because if the support frame were moved quickly to the center, the photographer would sense fluctuation of image through the lens 74 which is discomforting and because even with exposure during this period there occurs no degradation of the image due to movement of the support frame 75. (For example, the support frame is moved 5 µm per one eighth second.)

In more detail, the outputs from the position detecting elements 78*p*, 78*y* are stored at the point of arrow 719*i* in FIGS. 23A to 23C, control of the support frame 75 is started using the output values as target values, and for the period of one second thereafter the support frame 75 is moved for a target at the center of the optical system preliminarily set (see 75*g* in FIGS. 23A to 23C).

After the lock ring 719 is rotated (or unlocked), the support frame 75 is driven, based on the target values from the vibration detecting means (overlapping with the moving operation of the center position of the support frame 75 discussed above), thus starting the image blur prevention.

Here, when the image blur prevention is turned off at the point of arrow 719*j* in order to end the image blur prevention, the target values from the vibration detecting means are not input into the correction means, and the support frame 75 is stopped as controlled at the center position. Energization of the adsorption coil 730 is stopped at this point (730*b*). Then the adsorptive force of the armature 724 by the adsorption yoke 729 disappears so as to rotate the lock ring 719 clockwise by the lock spring 728 and to return it to the state of FIG. 22A. In this case, the lock ring 719 goes into contact with the lock rubber 726 to stop rotating, which controls the colliding sound of the lock ring 719 in the low level at the end of rotation.

After that, (for example, after 20 msec), the control on the correction means is interrupted so as to complete the timing chart of FIGS. 23A to 23C.

FIGS. 24A and 24B are block diagrams to show the scheme of the image blur prevention system.

In FIGS. 24A and 24B, reference numeral 91 designates the vibration detecting means 83*p*, 83*y* shown in FIG. 15, which is composed of a vibration detection sensor for detecting an angular velocity, such as a vibration gyro, and a sensor output arithmetic means for first cutting the DC component in the output from the vibration detecting sensor and thereafter integrating the output to obtain an angular displacement.

The angular displacement signal from this vibration detecting means 91 is input into a target value setting means 92. This target value setting means 92 consists of a variable differential amplifier 92*a* and a sample hold circuit 92*b*. Since the sample hold circuit 92*b* is always in a sampling state, two signals input into the variable differential amplifier 92*a* are always equal to each other and an output therefrom is zero. However, once the sample hold circuit 92*b* changes into a hold state by an output from a delay means 93 described hereinafter, the variable differential amplifier 92*a* starts continuously outputting as setting that point as zero.

An amplification factor of the variable differential amplifier 92*a* can be variably set by an output from an image blur prevention sensitivity setting means 94. The reason is as follows. The target value signal of the target value setting means 92 is a target value (command signal) which the correction means is allowed to follow, whereas a correction amount of the image plane against a drive amount of the correction means (image blur prevention sensitivity) changes depending upon optical characteristics based on a focus change of zooming, focusing, or the like. Therefore, the amplification factor is arranged as variable in order to compensate for the change of image blur prevention sensitivity.

Thus, the image blur prevention sensitivity setting means 94 takes in zoom focal-length information from a zoom information output means 95 and focus focal-length information based on distance measurement information from an exposure preparation means 96, calculates the image blur prevention sensitivity, based on the information, or extracts the information of image blur prevention sensitivity preliminarily set, based on the information, and changes the amplification factor of the variable differential amplifier 92*a* in the target value setting means 92.

The correction drive means 97 is the ICs 731*p*, 731*y*, 732 mounted on the hard board 715, and receives the target value from the target value setting means 92 as a command signal 730*p*, 730*y*.

A correction start means 98 is a switch for controlling the connection between the IC 732 on the hard board 715 and the coil 76*p*, 76*y*. In the normal condition, the switch 98*a* is connected to the terminal 98*c* to short both ends of each coil 76*p*, 76*y*. Receiving a signal from a logical product means 99, the switch 98*a* is connected to the terminal 98*b* to bring the correction means 910 into the control state (in which the fluctuation correction is not carried out yet but power is supplied to the coils 76*p*, 76*y* so as to stabilize the correction means 910 at the position where the signals of the position detecting elements 78*p*, 78*y* are almost zero). At the same time, the output signal from the logical product means 99 is input into an engagement means 914, whereby the engagement means releases engagement of the correction means 910.

The correction means 910 supplies the position signals of the position detecting elements 78*p*, 78*y* to the correction drive means 97 to effect the position control as described previously.

When the logical product means 99 receives both a release half press SW1 signal from a release means 911 and an output signal from an image blur prevention switching means 912, an AND gate 99*a* as a constituent component thereof outputs a signal. Namely, if the photographer manipulates the image blur prevention switch in the image blur prevention switching means 912 and if half press release is effected through the release means 911, the correction means 910 is released from engagement to turn into the control state.

The SW1 signal from the release means 911 is input into the exposure preparation means 96, whereby photometry, distance measurement, and lens focusing drive is carried out and whereby the focus focal-length information is input into the image blur prevention sensitivity setting means 94, as described previously.

The delay means 93 receives the output signal from the logical product means 99, and outputs it, for example, one second after to let the target value setting means 92 output the target value signals, as described above.

Although not shown, the vibration (fluctuation) detecting means 91 also starts in synchronization with the SW1 signal from the release means 911. As discussed previously, the sensor output arithmetic including a large time constant circuit, such as an integrator, requires some time from start before the output becomes stable.

The delay means 93 plays a role to wait before the output from the vibration detecting means 91 becomes stable and thereafter outputs the target value signals to the correction means 910 and is arranged to start the image blur prevention after the output from the vibration detecting means 91 is stabilized.

Receiving the release full press SW2 signal from the release means 911, an exposure means 913 moves the mirror up, effects exposure by opening and closing the shutter at a shutter speed obtained based on the photometry value of the exposure preparation means 96, and moves the mirror down, thereby completing photography.

After completion of photography, when the photographer moves the hand off the release means 911 to make the SW1 signal off, the logical product means 99 stops outputting to bring the sample hold circuit 92*b* in the target value setting means 92 into the sampling state and to make the output from the variable differential amplifier 92*a* zero. Thus, the correction means 910 returns into the control state with the correction drive being suspended.

Since the output of the logical product means 99 is turned off, the engagement means 914 effects engagement of the correction means 910 and thereafter the switch 98*a* of the correction start means 98 becomes connected to the terminal 98*c*, thus stopping the control of the correction means 910.

A timer, not shown, keeps the vibration detecting means 91 continuously operating for a certain period (for example, for five seconds) even after the stopping of manipulation of the release means 911, and then it is stopped. The reason of this is as follows. The photographer often again performs the release operation after the stopping of the release operation. In that case, the above arrangement can prevent the vibration detecting means 91 from being restarted every time the operation is preformed and can decrease the standby time before stabilization of the output therefrom. When the vibration detecting means 91 is already started, the vibration detecting means 91 sends an already-start signal to the delay means 93 to shorten the delay time.

The reason why the arrangement of the support balls 79*a*, 79*b* and the charge springs 710 as shown in FIG. 16 is adopted is that assembling is proceeded in such a state that the left side on the plane of FIG. 16 is set up, then the support balls 79*b* that can be temporarily fixed by grease are set down to keep the charge springs 710 and support balls 79*a* up upon assembling, thereby preventing these elements from dropping, and then the first yoke 712 is mounted thereon, whereby the support balls 79*a*, 79*b* and charge springs 710 can be prevented from dropping off from the support frame 75.

The charge force of the charge springs 710 is a resultant of forces at three positions as surpassing the force supporting the weights of the support frame 75 and lens 74, and thus urges the support frame 75 and lens 74 toward the second yoke 72 even though the correction means has any posture, thus stabilizing the optical system.

However, if the charge force of charge spring 710 were arranged to support the self-weight of the lens 74 at a position, slide friction would become greater against the first yoke 712 and the second yoke 72 in contact with the support balls 79*a*, 79*b* so as to obstruct smooth slide.

Therefore, it is desired to arrange the charge force of the charge springs 710 so as to stand for the self-weight of lens 74 by the resultant of forces at three positions and to such an extent that the charge spring at each position is just deflected by the self-weight of lens 74.

FIG. 16 shows a state in which the projections 75*f* of the support frame 75 are in a disengaged state from the internal peripheral wall 719*g* of the lock ring 719 and in which the support frame 75 is in an image-blur-prevention-controllable state and the support frame 75 is properly pinched with respect to the base plate 71.

FIG. 25 shows a lateral cross section where the support frame 75 is locked by the lock ring 719.

The center of gravity G of the total of the support frame 75 and lens 74 at this time is located as shown, and they are subject to the force due to gravity, directed from this position to the bottom of the plane of FIG. 25. Since the position where the lock ring 719 supports the support frame 75 (the engagement portion) is located on the right side in the plane of drawing with respect to the center of gravity, as shown by arrow 62, a couple of forces appear in the support frame 75 as directed in the direction of arrow 63 about the center at the sliding surface of support balls 79*b* indicated by arrow 61.

As long as the projections 75*f* of the support frame 75 firmly fit (or bite) the internal peripheral wall 719*g* of the lock ring 719 at the three positions, the above coupling appearingly gives no effect on the support frame 75 at all.

There is, however, some play provided between the projections 75f of the support frame 75 and the internal peripheral wall 719g of the lock ring 719 in the actual arrangement.

It is because if the support frame 75 should firmly fit the lock ring 719 the rotational load would be great on the lock ring 719 upon unlocking next.

Therefore, the projection 75f at the position of arrow 62 is in contact with the internal peripheral wall 719g in the state of FIG. 25 (because of gravity), while the projections 75f at the other two positions are not in contact with the internal peripheral wall 719g. If the coupling appears in the direction of arrow 63 shown in FIG. 25 in this state, nothing can stop the lens 74 from inclining because of the coupling. In other words, since the charge force per charge spring 710 is weak as discussed above, the couple deflects the spring, so that the support ball 79a goes down into the support frame.

Namely, there was the problem that the optical performance differed between in the controlled state where the correction means was disengaged with the image blur prevention being on and in the engaged state of the correction means with the image blur prevention being off.

SUMMARY OF THE INVENTION

One aspect of the invention relates to an image blur prevention apparatus comprising a movable member moving for preventing an image blur, a regulating portion which sets the movable member to a non-movable state, and an operation portion which prevents the movable member from moving by the operation of the regulating member, and, by this structure, to keep the condition of the image blur prevention apparatus proper during the period in which the operation of the movable member is regulated.

BRIEF DESCRIPTION OF THE DRAWINGS

FIGS. 7A to 7C are sectional views for explaining a case wherein the pinching means of FIGS. 6A to 6C are allowed to slide in the opposite direction;

FIG. 12 is a sectional view for explaining the problem of the pinching means of FIG. 10;

FIG. 13 is a sectional view to show the structure of the pinching means in the fifth embodiment of the present invention;

FIGS. 23A to 23C are drawings to show signal waveforms upon drive of the lock ring of FIGS. 22A and 22B;

DETAILED DESCRIPTION OF THE PREFERRED EMBODIMENTS

The present invention will be explained in detail based on the embodiments as illustrated.

Figure 1:
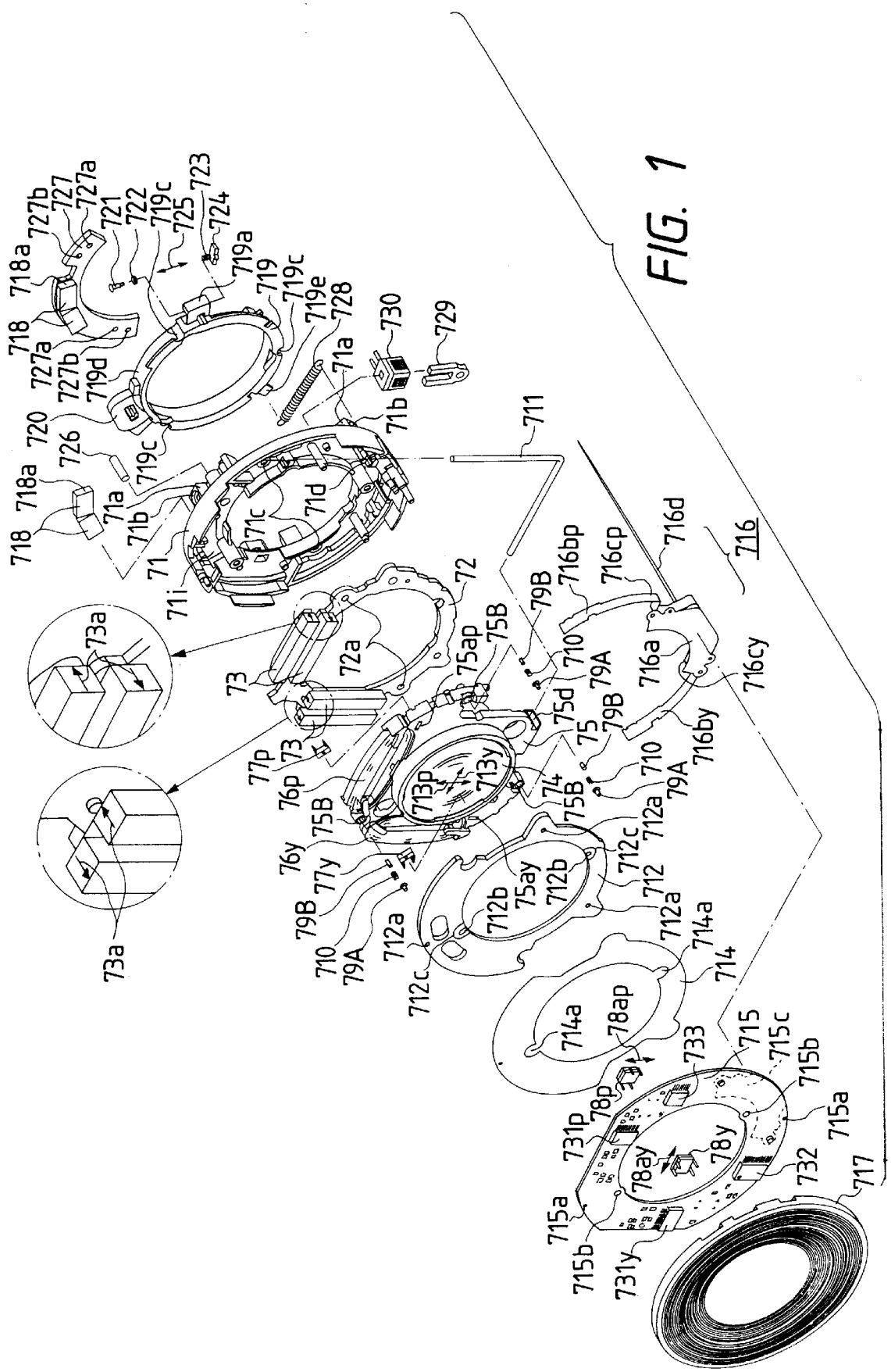
FIG. 1 is an exploded perspective view to show the structure of a correction optical apparatus according to the first embodiment of the present invention.
Figure 2:
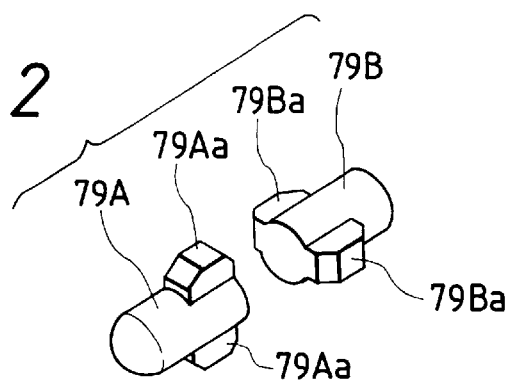
FIG. 2 is a perspective view to show the structure of support balls of FIG. 1.
Figure 15:
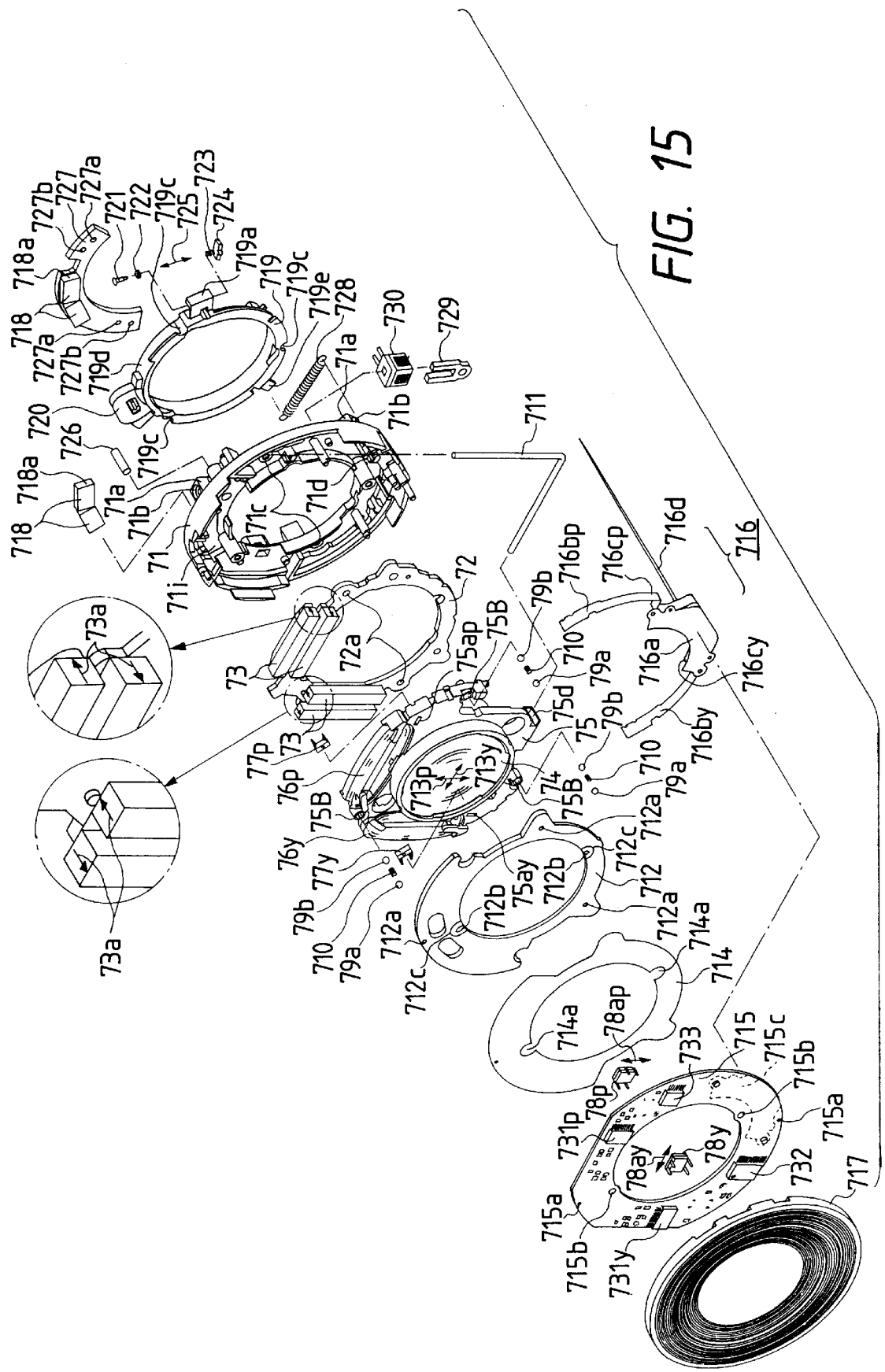
FIG. 15 is an exploded perspective view to show the structure of the correction optical apparatus of FIG. 14.

FIG. 1 is an exploded perspective view of the correction optical apparatus according to the first embodiment of the present invention, which is different from the conventional apparatus shown in FIG. 15 in the configuration of the support balls 79a, 79b and in the holes 75b of the support frame 75 in which the support balls 79a, 79b are set. Thus, the support balls are denoted by 79A, 79B and the holes 75b by 75B in the present embodiment. FIG. 2 shows an enlarged view of the support balls 79A, 79B.

The support balls 79A, 79B are made, for example, of POM, and are incorporated so that wing portions 79Aa, 79Ba are shifted 90° in phase from each other as shown in FIG. 2.

Figure 3:
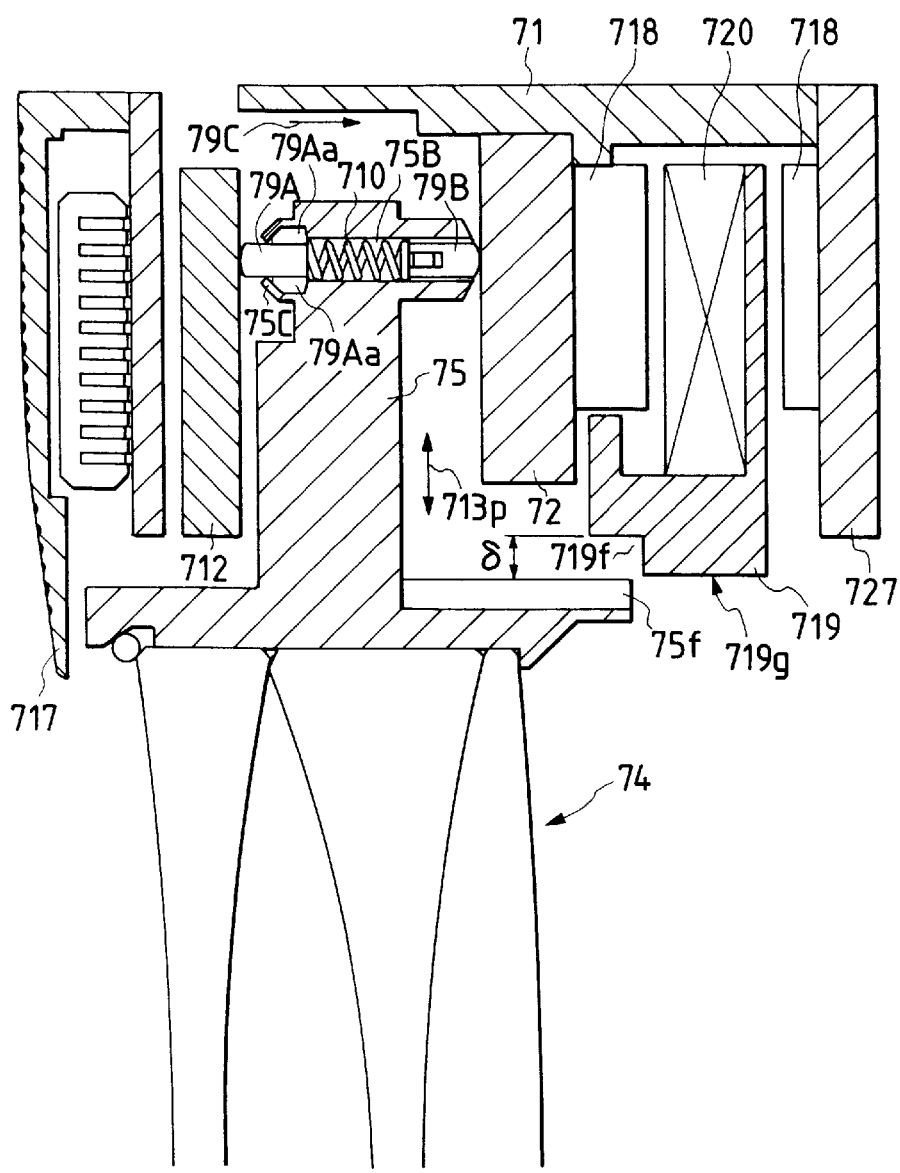
FIG. 3 is a sectional view to show a state in which the support frame is assembled with the base plate of FIG. 1.
Figure 4A:
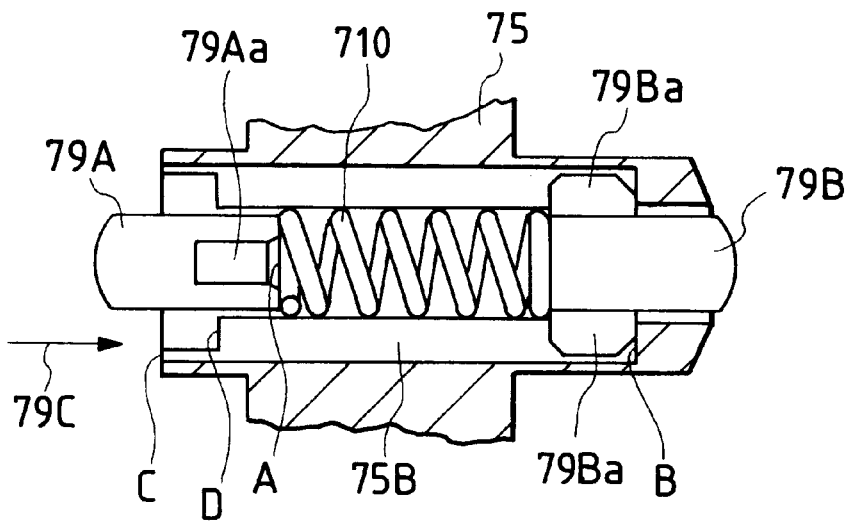
FIGS. 4A and 4B are drawings for explaining a configuration of a hole in the support frame in which a pinching means of FIG. 3 is set.
Figure 4B:
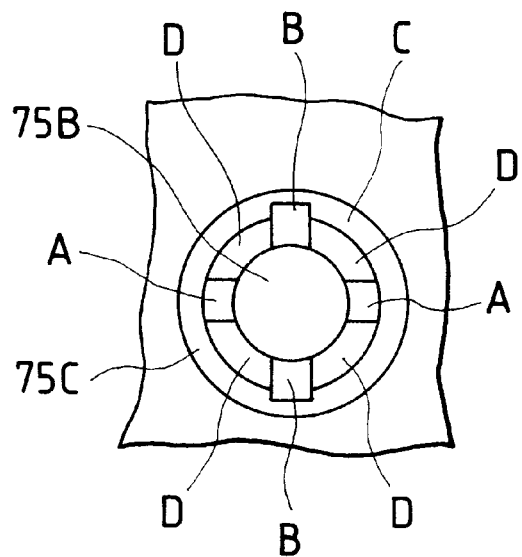

FIG. 3 and FIGS. 4A and 4B are the lateral cross section of the correction means after assembled and drawings to show the details of the support balls 79A, 79B and hole 75B. The above support balls 79A, 79B and charge spring 710 are set in each hole 75B (at three positions) of the support frame 75 and the support ball 79A is fixed to the support frame 75 by thermal calking, as shown in FIG. 3 and FIGS. 4A, 4B. (The support thermal ball 79B is slidable in the direction of extension of the hole 75B against the spring force of the charge spring 710.)

Describing in further detail, the support ball 79B, the charge spring 710 in a charged state, and the support ball 79A are inserted in the named order in the direction of arrow 79c into the hole 75B of the support frame 75 (note that the support balls 79A, 79B are components shaped in the same configuration), and finally the peripheral edge 75C of the hole 75B is thermally calked to prevent the support ball 79A from slipping off. In FIG. 4B, A to D represent depths of contact portions formed in the hole 75B.

Here, because the rear end of the wing portion 79Aa of the support ball 79A is received and restricted by the range of plane of depth A, the support ball 79A is fixed relative to the support frame 75 by thermal calking of the peripheral edge 75C.

Since the tip of the wing portion 79Ba of the support ball 79B is received by the range of plane of depth B, the support ball 79B is stopped from slipping off in the direction of arrow 79c out of the hole 75B because of the charge spring force of the charge spring 710.

Of course, since the support ball 79B is received by the second yoke 72 after completion of assembling of the correction means, as shown in FIG. 3, it will not slip off from the support frame 75, but the plane B as a range for stopping slip-off is provided taking ease of assembly into consideration.

Supposing the support frame 75 is formed by molding, the configuration of the hole 75B of the support frame 75 shown in FIG. 3 and FIGS. 4A, 4B can be molded by simple two-split dies, die drawing of which can be done opposite to the arrow 79c, without requiring a complex interior slide die, and the dimensional accuracy can be set higher thereby.

Since the above arrangement permits the charge springs 710 to be preliminarily set in the charged state in the support frame 75, it can prevent the support balls 79B and charge springs 710 from slipping off during assembling works, thus extremely improving workability.

Here, the support balls 79A, 79B are made of POM and the first yoke 712 and the second yoke 72 to be pinching surfaces are made of metal. The reason why the support balls 79A, 79B are not made of metal is to avoid scratches or damage by shock. Let us suppose that the support balls 79A, 79B were made of metal.

Figure 5A:
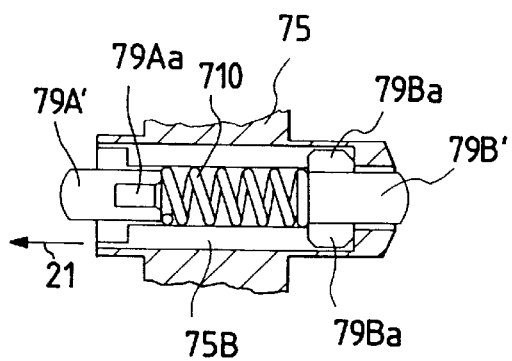
FIGS. 5A to 5C are sectional views for explaining a case wherein the support balls of FIG. 1 are made of a metal and the pinching means is allowed to slide.
Figure 5B:
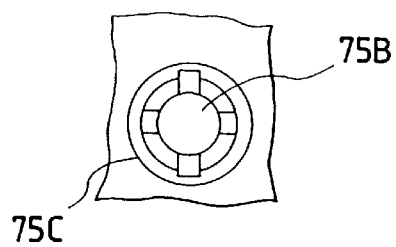
Figure 5C:
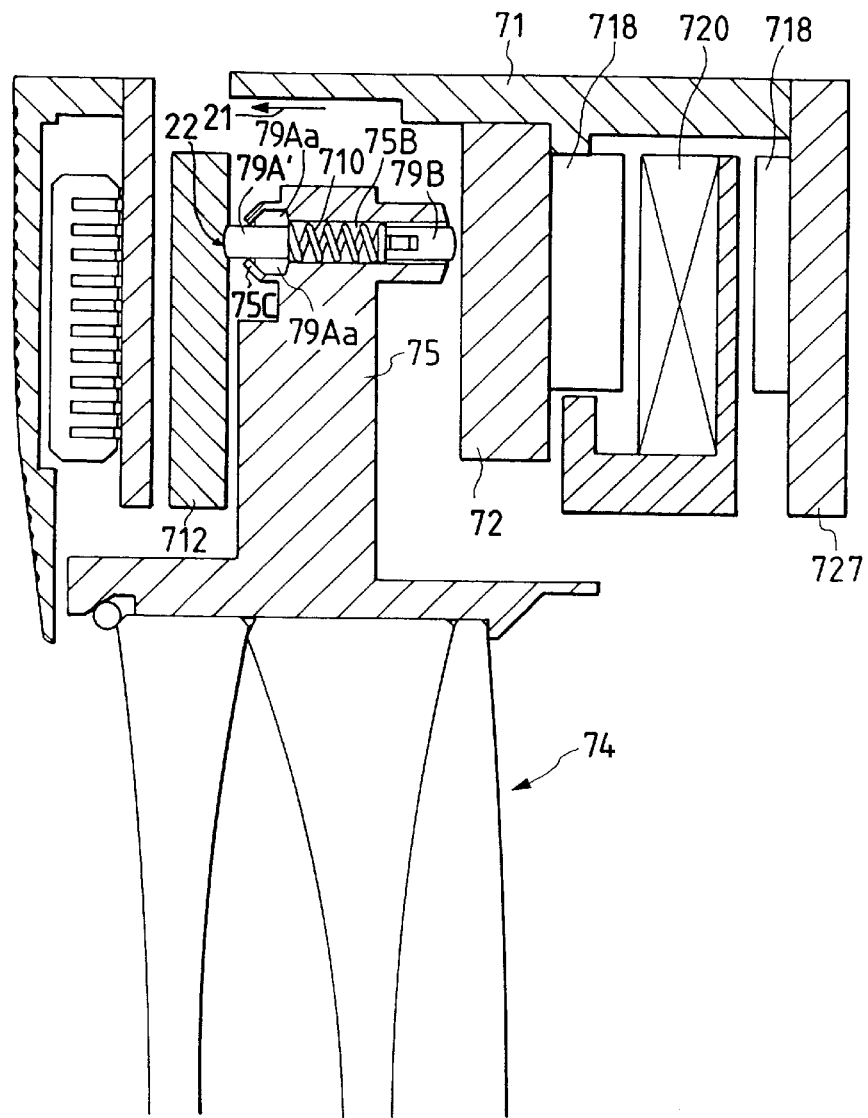

FIGS. 5A to 5C are sectional views when in such arrangement the support frame 75 is urged in the direction of arrow 21 by shock or the like.

Since the support ball 79A' is in spherical contact with the flat surface of the first yoke 712, the contact area is small. Because of this, the force directed in the direction of arrow 21 forms a gouge 22 on the side of the first yoke 712. In that case, when the support frame 75 next moves in the sliding direction, to climb over the gouge 22 becomes a great load. This means that the image blur prevention cannot be performed with accuracy.

Figure 6A:
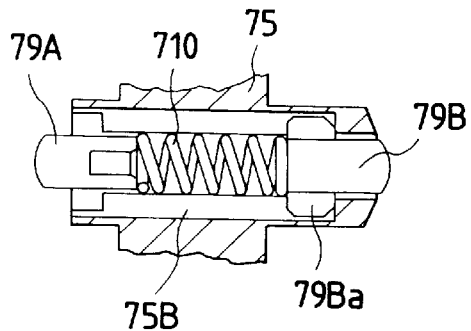
FIGS. 6A to 6C are sectional views for explaining a case wherein the support balls of FIG. 1 are made of POM and the pinching means is allowed to slide.
Figure 6B:
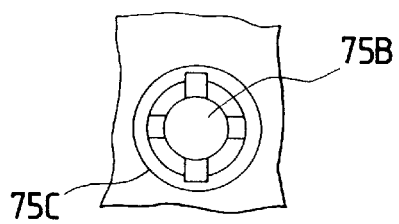
Figure 6C:
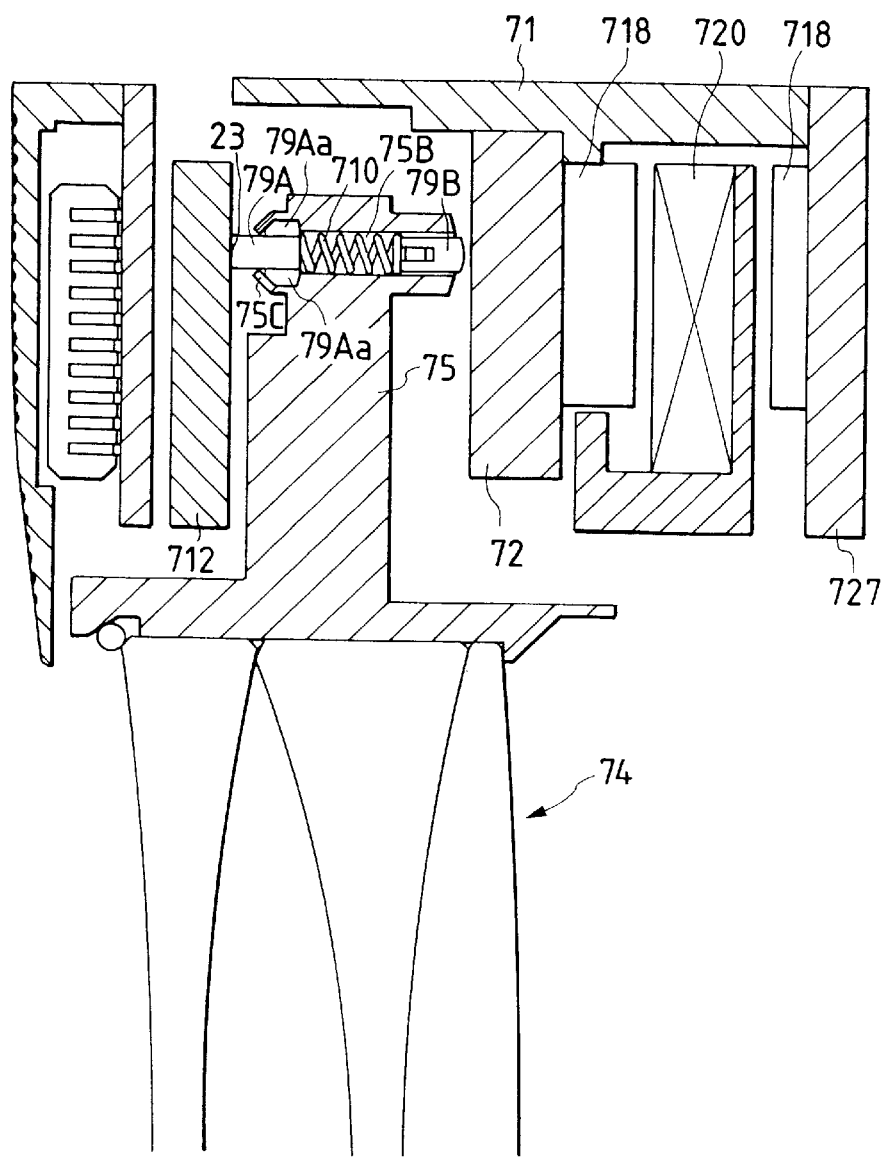

When the support ball 79A is made of POM as in the present embodiment, only the tip portion of the support ball 79A is crushed as shown by flat surface 23 in FIGS. 6A to 6C, so that no gouge appears on the first yoke 712. In this case, the sliding resistance increases because of the flat contact between the support ball 79A and the first yoke 712, but the load is not so large as in the case of FIGS. 5A to 5C and the effect on the image blur prevention is little.

Next, let us consider a case in which the support frame 75 moves in the opposite direction because of shock.

In FIGS. 7A to 7C, the support frame 75 is subject to the force in the direction of arrow 31. However, the support ball 79B moves into the support frame 75 against the charge force of the charge spring 710 at this time. Therefore, the second yoke 72 goes into contact with the support frame 75 at the flat surface 32 in the peripheral portion of the hole 75B of the support frame 75. Since this flat surface 32 has a large area, the impact force per unit area is small, and leaves no gouge in the second yoke 72.

As described above, the durability in the pinching portions can be improved by the combination of materials and by providing the support frame 75 with the receiving surface of a large area upon the application of impact.

Figure 25:
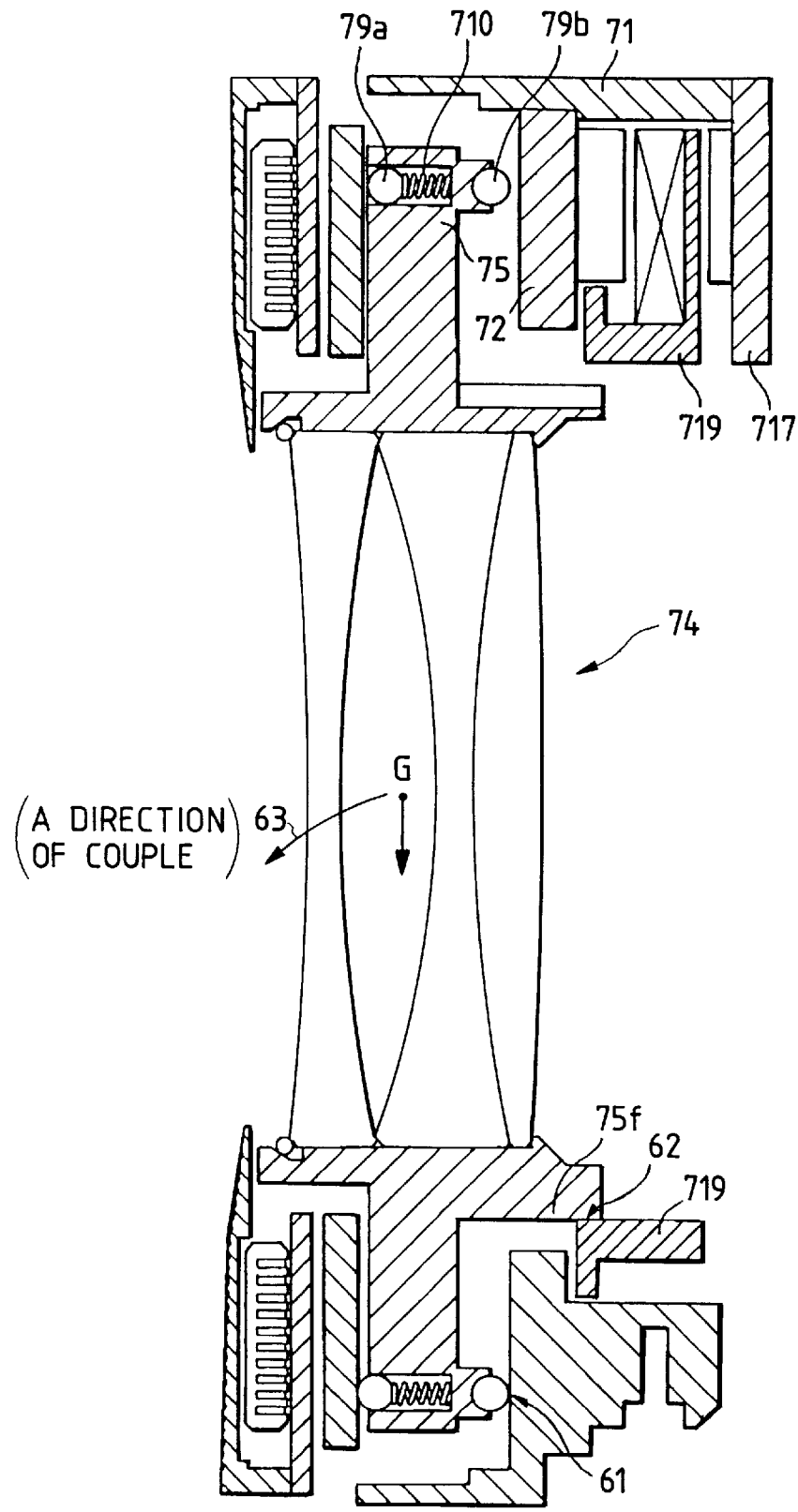
FIG. 25 is a sectional view for explaining the problem of the conventional correction optical apparatus.

As seen from FIG. 3 and FIGS. 4A, 4B, because the support ball 79A is fixed to the support frame 75, even if the support frame 75 is engaged with the lock ring 719 and the couple of forces come to act in the direction of arrow 63 as shown in FIG. 25, the support frame 75, that is, the lens 74 can be stopped from inclining in that direction.

As described above, by providing the limiting portion (the support ball 79A fixed to the support frame 75 in FIG. 3) for receiving the coupling appearing because of the positional relation between the center of gravity of the correction means and the engagement portion, inclination of the support frame 75 can be prevented without increasing the charge force of the charge spring 710, thus meeting both requirements of the sliding property and optical stability of the correction means.

In FIG. 3, the mask 717 is mounted on the left side of the plane of the drawing and this side is the object side of the photographic optical axis.

Thus, the support frame 75 is urged by the charge springs 710 toward the object side of the photographic optical axis relative to the base plate 71. This presents the following advantages.

The resultant of charge forces of the charge springs 710 is sufficient to support the self-weights of the support frame 75 and lens 74, as described above, but the margin is not so great. Thus, when the taking lens is directed in a direction so as to deflect the charge springs 710 and if an impact is applied in that direction, in that state the charge springs 710 becomes deflected at that moment.

In performing no image blur prevention, the support frame 75 is in contact with the internal peripheral wall 719g of the lock ring 719 by its projection 75f, thus causing friction in this portion.

After the charge springs 710 are deflected and when they move back thereafter, there is a possibility that the support frame 75 does not return fully to the original position.

Considering the carrying states of lens, photographers usually carry the camera body with the lens mounted thereon while putting a strap of the camera body on their shoulder, and at that time, the photographic axis of lens is directed downward (toward the ground). Conversely speaking, it is rare to carry and use the lens as keeping it upward (to the sky).

Figure 16:
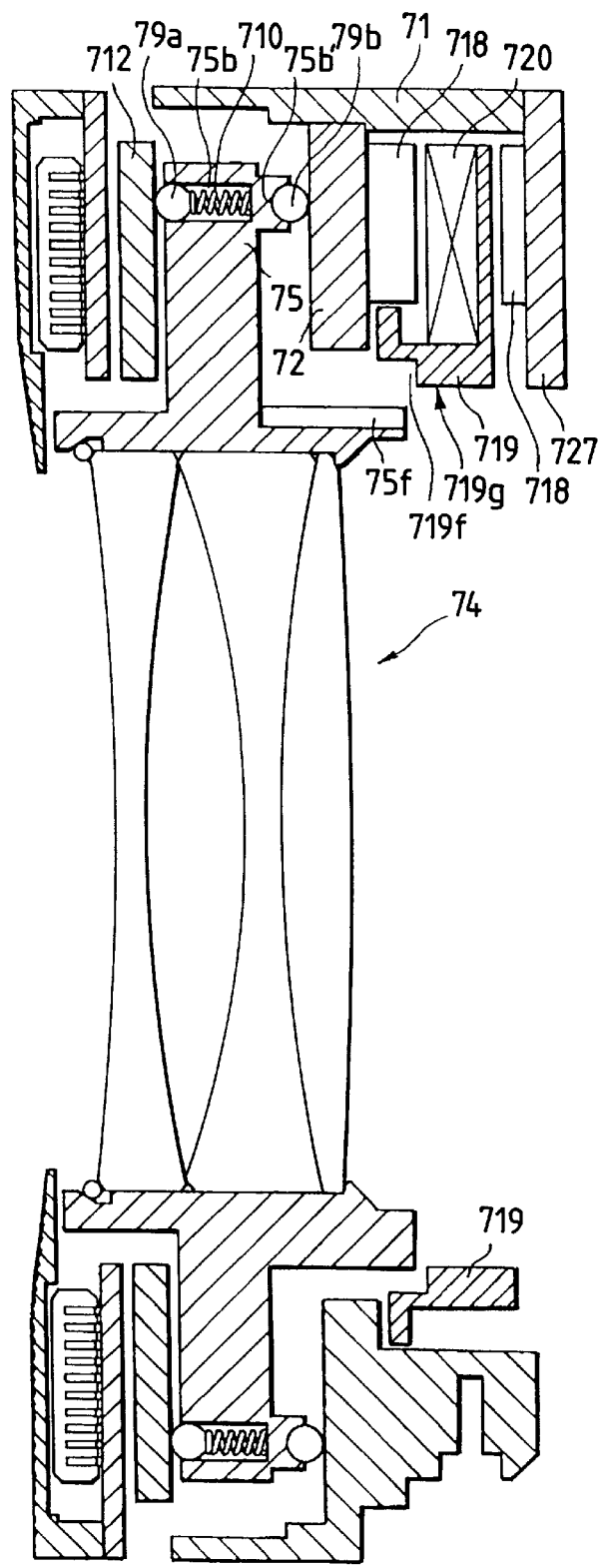
FIG. 16 is a sectional view to show a state in which the support frame is assembled with the base plate of FIG. 15.
Figure 17:
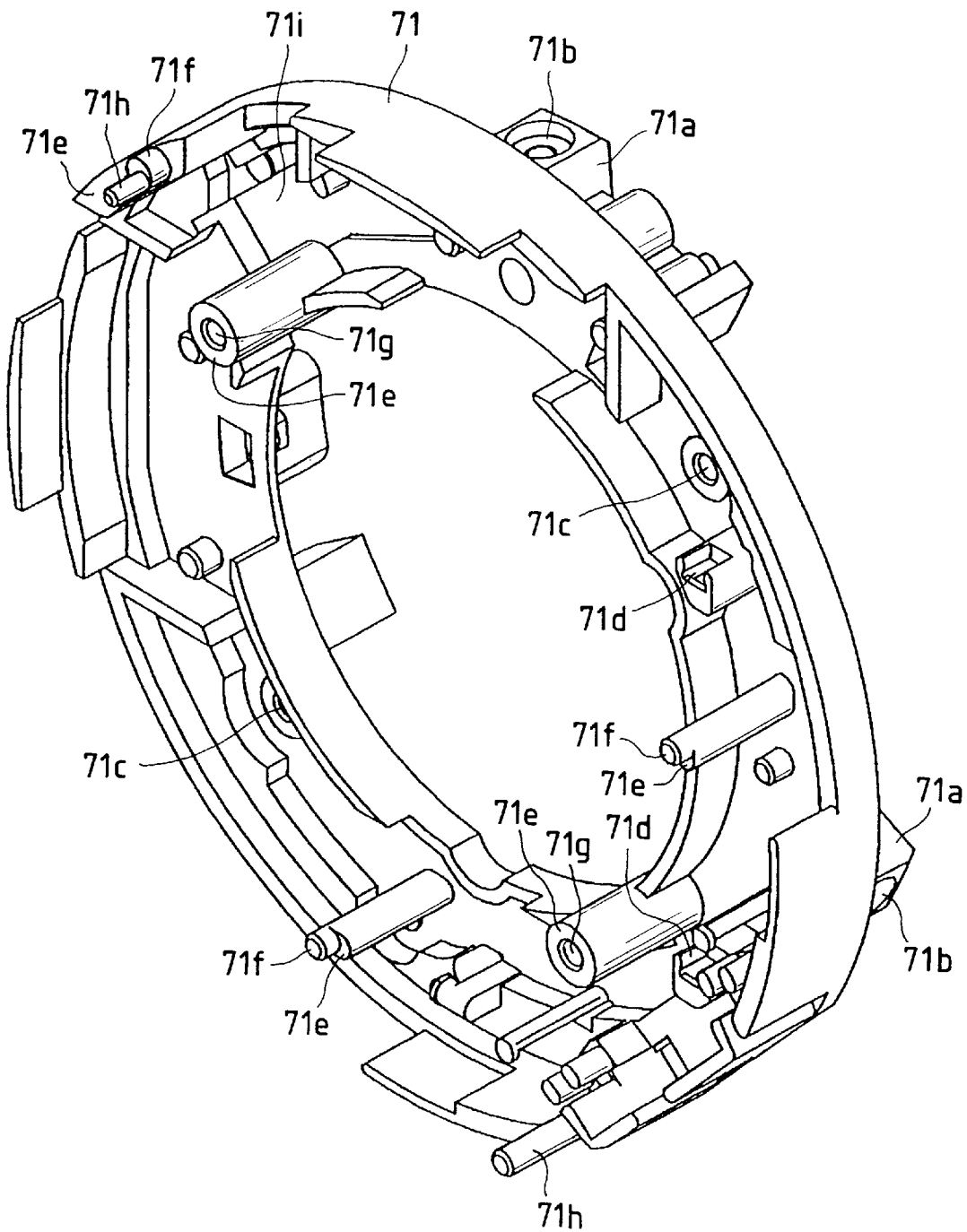
FIG. 17 is a perspective view to show the base plate shown in FIG. 15.
Figure 18:
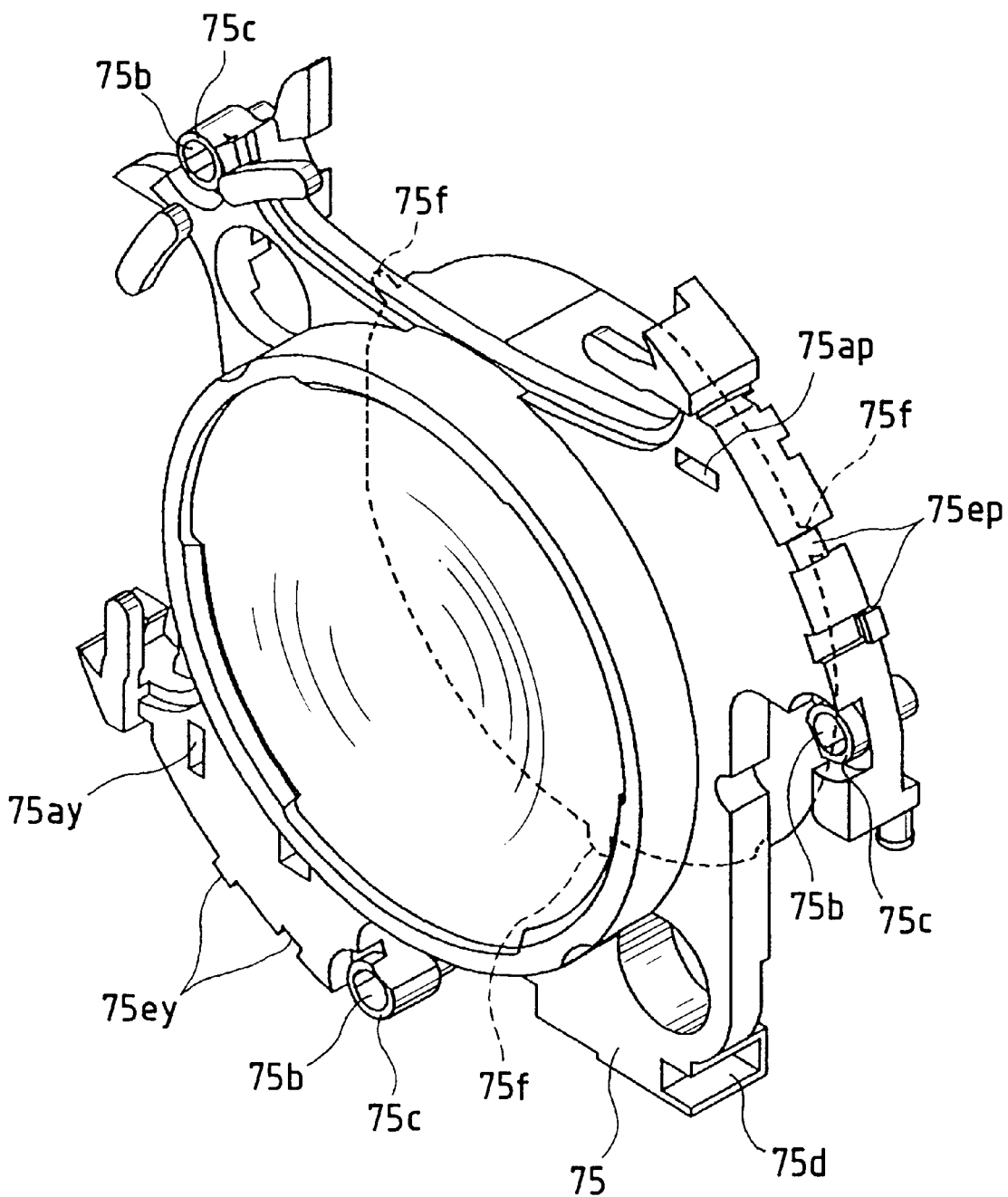
FIG. 18 is a perspective view to show the support frame shown in FIG. 15.
Figure 19:
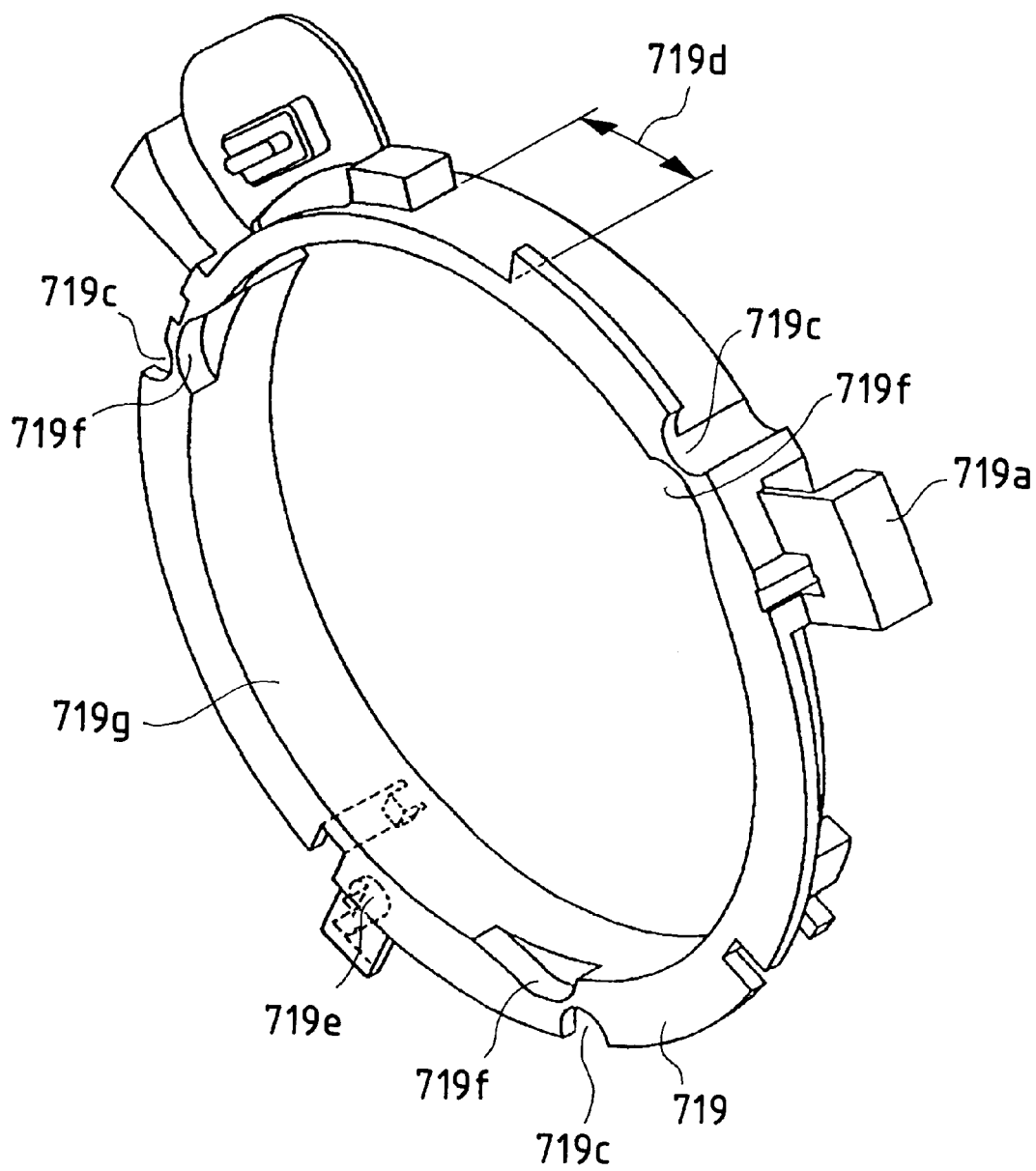
FIG. 19 is a perspective view to show the lock ring shown in FIG. 15.
Figure 20:
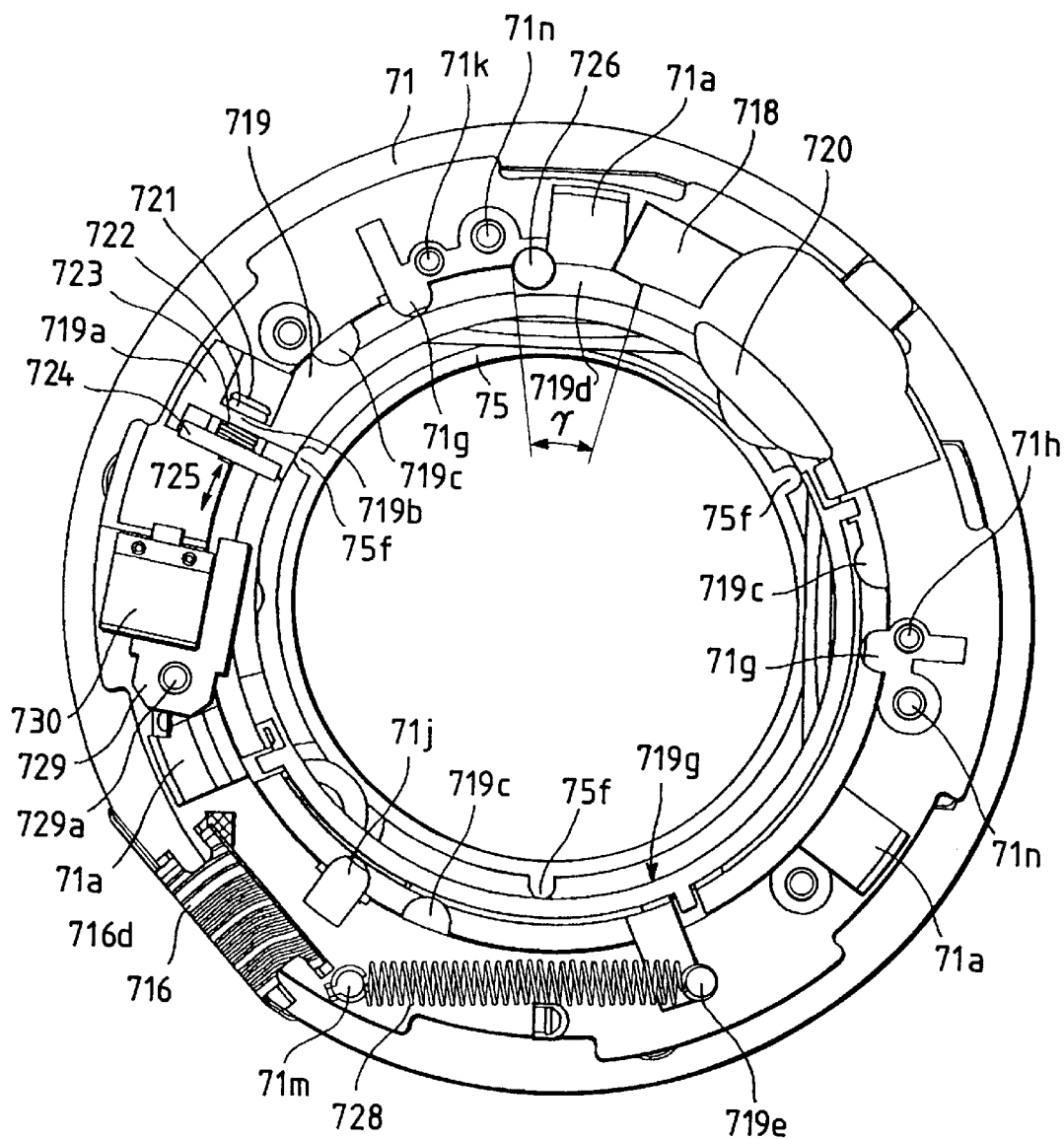
FIG. 20 is a front view to show the support frame etc. of FIG. 15.
Figure 21:
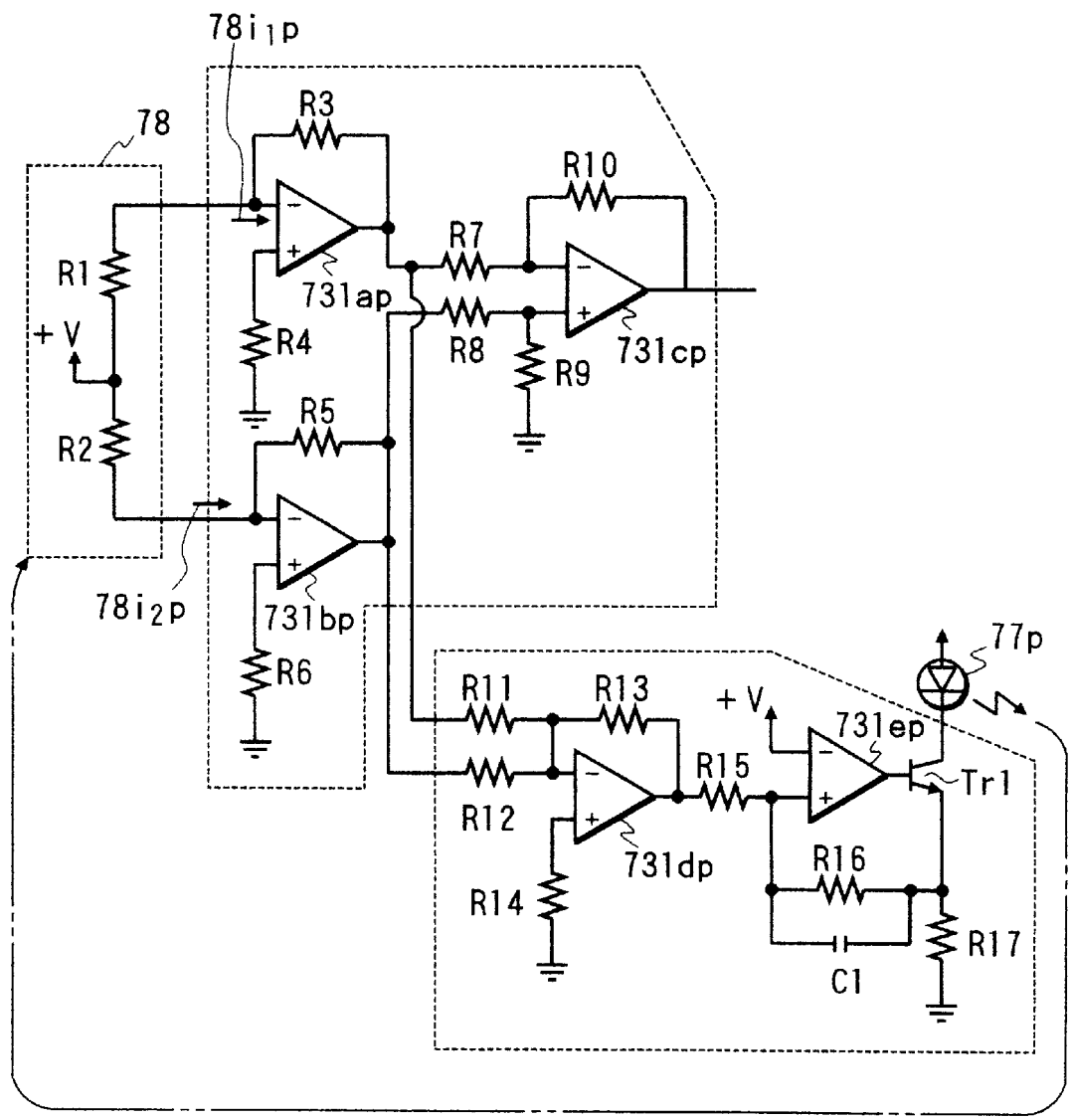
FIG. 21 is a circuit diagram to show the structure of the IC for amplifying the output from the position detecting element of FIG. 15.
Figure 22A:
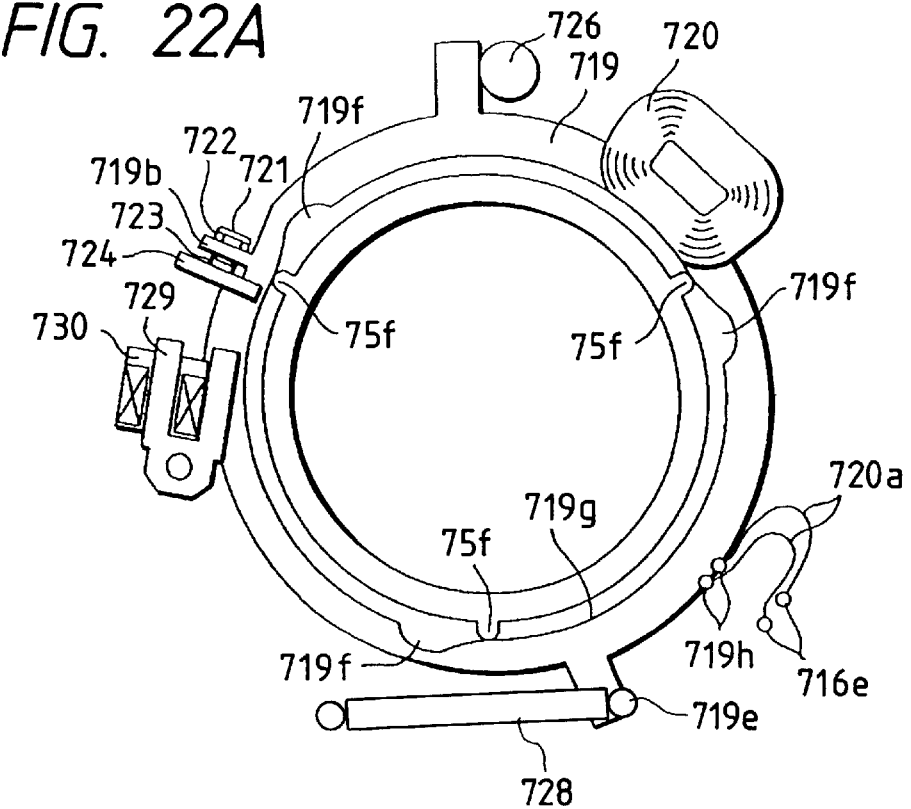
FIGS. 22A and 22B are drawings to show states of the lock ring of FIG. 16 when driven.
Figure 22B:
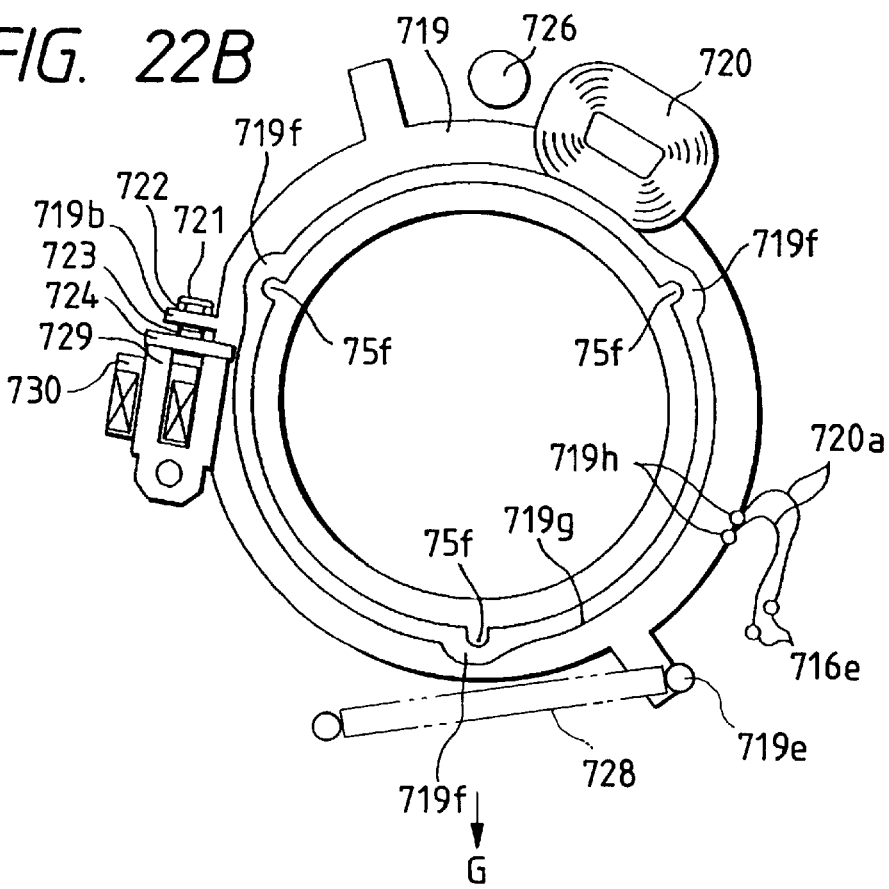
Figure 24B:
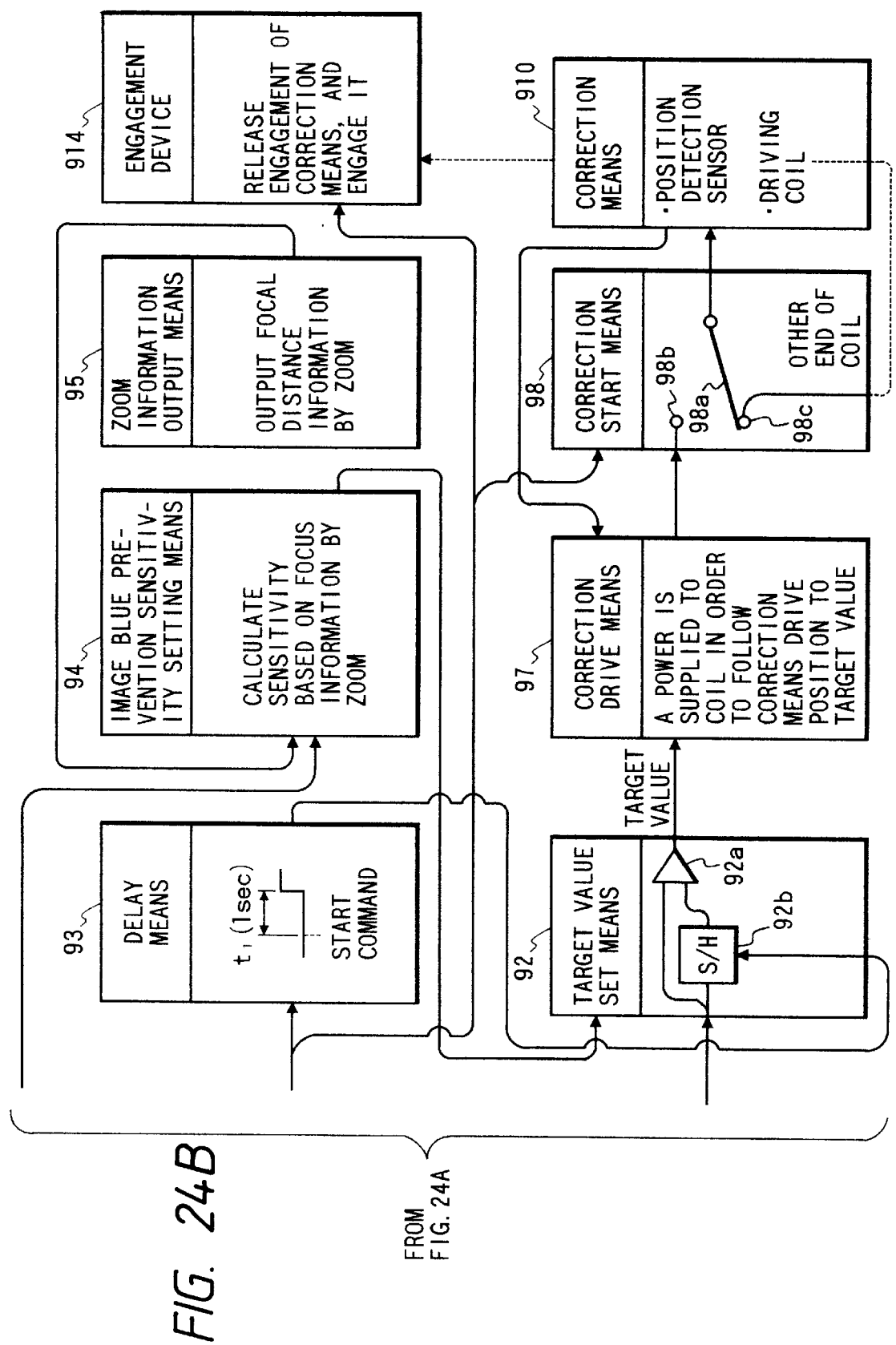
FIG. 24 is comprised of FIGS. 24A and 24B showing block diagrams illustrating the circuitry structure of the image blur prevention system of the camera equipped therewith.

In the case of the conventional example as shown in FIG. 16, while the camera is carried, an urging force (the weight and impact force) toward the object is exerted on the support frame 75, which may deflect the charge springs 710.

After that, when the photographer keeps the lens horizontal to aim at the object, there is some chance that the support frame 75 is not returned fully to the original position (or that the optical performance is not stable yet).

In contrast, employing the layout in which the support frame 75 is urged toward the object side of the photographic axis as shown in FIG. 3 (or in which it is urged toward the ground when carried), the above problem will not arise because the charge springs 710 are not deflected when carried.

Second Embodiment

Figure 8:
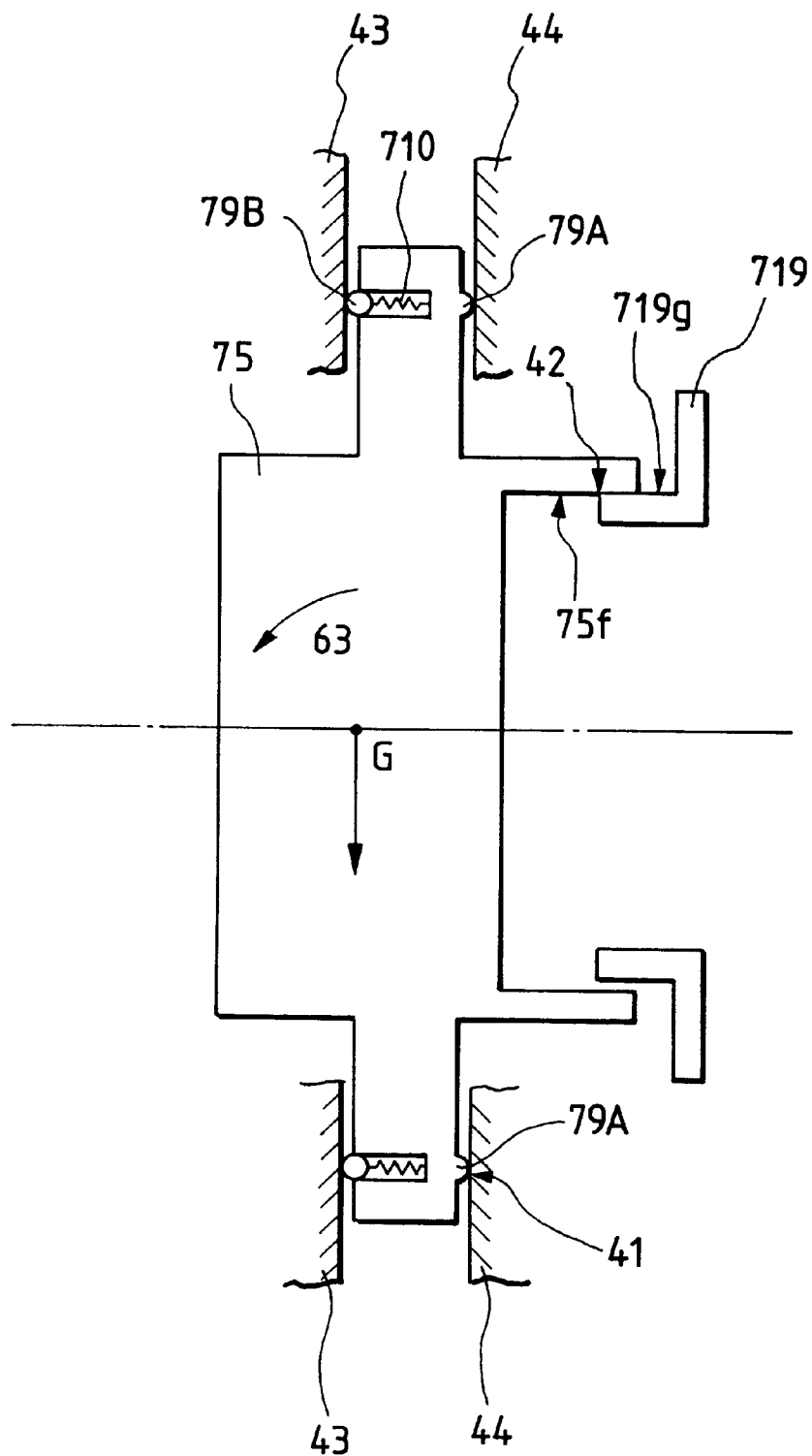
FIG. 8 is a sectional view to show the structure of the major part of the correction optical apparatus according to the second embodiment of the present invention.

FIG. 8 is a drawing to show the structure of the major part according to the second embodiment of the present invention, which is different from the foregoing examples in the engagement method of the correction means, wherein the lock ring 719 is set inside the inner diameter of the support frame 75 and a projection 75*f* of the support frame 75 is engaged in contact with the outer peripheral wall 719*g* of the lock ring 719.

In that arrangement, under the state of the gravity shown in FIG. 8, the lock ring 719 keeps the support frame 75 suspended at the portion of arrow 42 (whereas the support frame 75 is in contact with the lock ring 719 at the portion of arrow 62 in FIG. 25 so that the support frame 75 is supported in an inverted pendulum state).

At this time, the support ball 79A at arrow 41 (the member to slide in contact with the first flat surface 44) receives strong force in the direction of arrow 63 because of the coupling, and inclination of the support frame 75 upon engagement can be prevented by such arrangement that the support balls 79A (fixed sliding means) are fixed relative to the support frame 75 and the opposite-side support balls 79B (movable sliding means; the members to slide in contact with the second flat surface 43) are charged by the charge springs 710.

As explained above, the optical performance can be stabilized as determining the urging direction of the support frame 75 relative to the base plate 71 by the arrangement in which the correction means is engaged in the inverted pendulum state or in the suspended state and by the positional relation between the position of the center of gravity at that time and the engagement portion. In other words, the optical performance can be stabilized by determining the urging direction of the support frame 75, taking the carrying state of lens into consideration, and by determining the positional relation between the center of gravity and the engagement portion, and the engagement state (the inverted pendulum state or the suspended state), based on the urging direction determined.

Modification of the First and the Second Embodiments

The foregoing embodiments were described under such an assumption that the position of occurrence of the thrust (driving force) of the coils 76*p*, 76*y* was located nearly at the same position as the position of the center of gravity of the correction means.

It is, however, not always possible to make the position of occurrence of the driving force of the coils 76*p*, 76*y* (driving means) coincident with the position of the center of gravity from the designing restrictions. In this case, the coupling is also exerted on the correction means because of the positional relation between the occurring position of the driving force and the center of gravity.

Let us consider the relation between the position of the driving means and the urging direction of the support frame 75 at this time.

Figure 9:
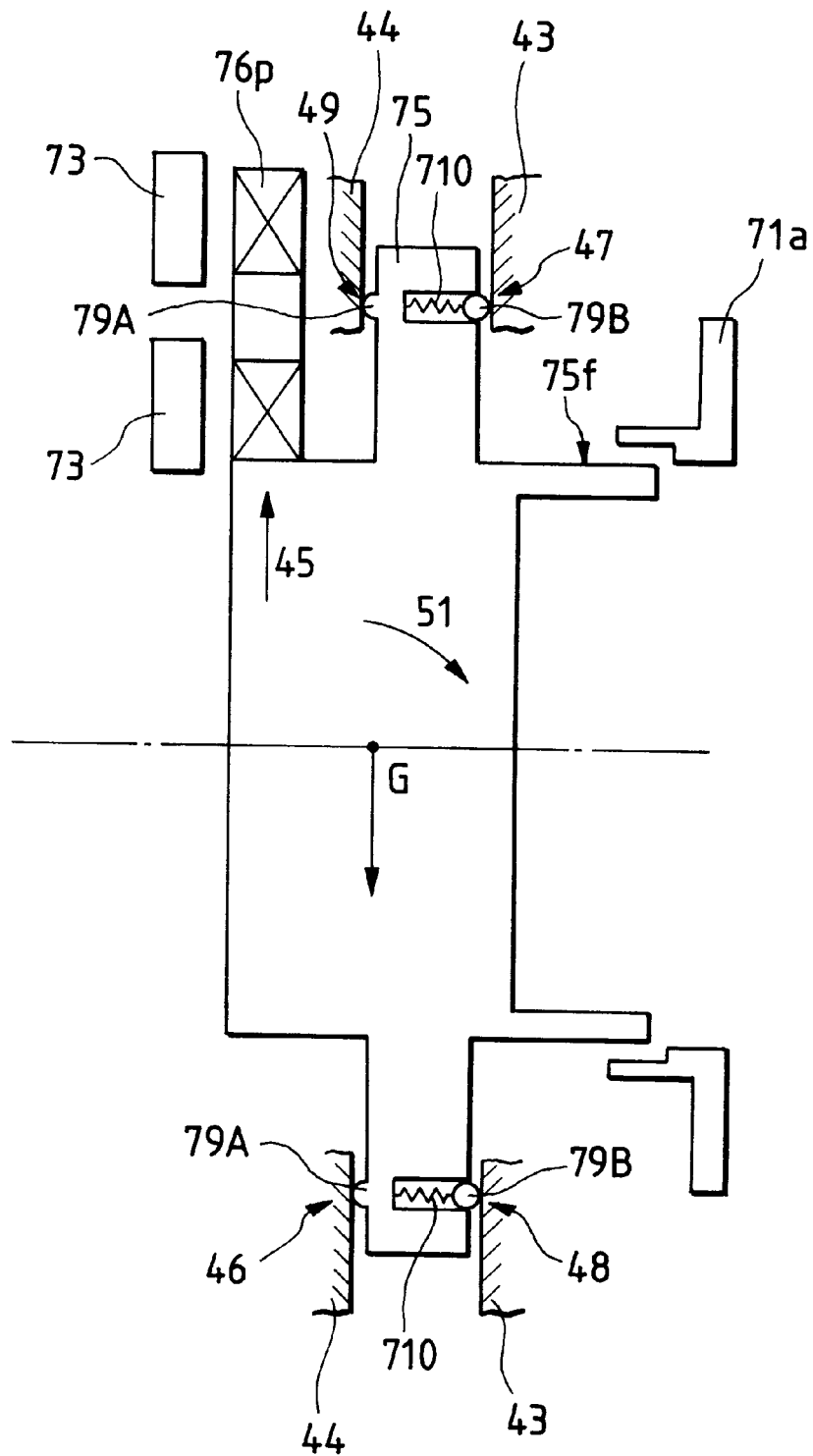
FIG. 9 is a sectional view to show the structure of the major part of the correction optical apparatus according to the second embodiment of the present invention.

In FIG. 9 the coil 76*p* (driving means) is located on the left side in the plane of the drawing with respect to the center of gravity and the correction means is supported in a suspended state by the coil 76*p* when controlled. Thus, the support ball 79A at arrow 46 receives the strongest force because of the couple 51 appearing from the positional relation with respect to the center of gravity. Therefore, the optical performance can be stabilized by fixing the support balls 79A to the support frame 75 (or by urging the support frame 75 to the left in the plane of drawing).

In the next place, if the coil 76*p* is located below the optical axis in FIG. 9, the correction means is supported in the inverted pendulum state during control. In that case, the great couple is applied to the support ball 79B at arrow 47. Then the optical performance can be stabilized by fixing the support balls 79B to the support frame 75. Similarly, the great couple is applied at arrow 48 when the coil 76*p* is located on the right side with respect to the center of gravity and above the optical axis; whereas the great couple is applied on the support ball 79A at arrow 49 when the coil 76*p* is located on the right side with respect to the center of gravity and below the optical axis; then the optical performance can be stabilized by fixing the support balls 79A to the support frame 75.

As explained above, the optical performance can be stabilized by changing the urging direction of the support frame 75 based on the position of the driving means (right or left from the center of gravity and above or below the optical axis) and the position of the engagement portion (right or left from the center of gravity and in the inverted pendulum engagement or in the suspended engagement). Here, let us obtain desired combinations of the position of the driving means and the position of the engagement portion of the engagement means when the support frame 75 is urged to the object side of the photographic axis with respect to the base plate 71, taking account of stability when carried as described above.

(a) The position of the driving means may be selected from the positions either in the suspended support state of the correction means where the driving means is located on the object side of the photographic axis with respect to the center of gravity or at a position coincident with the center of gravity or in the inverted pendulum support state of the correction means in which the driving means is located on the image plane side of the photographic axis with respect to the center of gravity or at a position coincident with the center of gravity.

(b) The position of the engagement portion of the engagement means may be selected from the positions in the suspended engagement state of the correction means in which it is located on the object side of the photographic axis with respect to the center of gravity or at a position coincident with the center of gravity or in the inverted pendulum support state of the correction means in which it is located on the image plane side of the photographic axis with respect to the center of gravity or at a position coincident with the center of gravity.

The above layouts can realize stabilization of the optical performance without degrading the image blur prevention performance (sliding property) of the correction means.

The embodiments described above can enjoy the following advantages.

(1) The optical performance can be stabilized by providing the limiting portion for receiving the couple occurring because of the positional relation between the center of gravity of the correction means and the engagement portion of the engagement means.

Describing this embodiment in more detail, degradation of the optical performance due to inclination of the lens during engagement of the correction means can be prevented:

by urging the correction means toward the object side of the photographic axis when the engagement portion is located on the image plane side of the photographic axis with respect to the center of gravity and the correction means is in inverted pendulum engagement (in the case of the first embodiment) or when the engagement portion is located on the object side of the photographic axis with respect to the center of gravity and the correction means is in suspended engagement (in the case opposite to the second embodiment); or by urging the correction means toward the image plane side of the photographic axis when the engagement portion is located on the image plane side of the photographic axis with respect to the center of gravity and the correction means is in suspended engagement (in the case of the second embodiment) or when the engagement portion is located on the object side of the photographic axis with respect to the center of gravity and the correction means is in inverted pendulum engagement (in the case opposite to the first embodiment).

(2) The optical performance can be stabilized by providing the limiting portion for receiving the couple occurring from the relation between the center of gravity of the correction means and the drive position of the driving means.

Describing this embodiment in more detail, degradation of the optical performance due to inclination of the lens during control of the correction means can be prevented:

by urging the correction means toward the object side of the photographic axis when the driving means is located on the object side of the photographic axis with respect to the center of gravity and the correction means is in suspended support or when the driving means is located on the image plane side of the photographic axis with respect to the center of gravity and the correction means is in inverted pendulum support; or by urging the correction means toward the photographic image plane when the driving means is located on the image plane side of the photographic axis with respect to the center of gravity and the correction means is in suspended support or when the driving means is located on the object side of the photographic axis with respect to the center of gravity and the correction means is in inverted pendulum support.

(3) Further, the optical performance can be always stabilized by pinching the correction means as urging it to the object side of the photographic axis, taking account of carrying the lens.

In the present invention the vibration detecting means may be selected from the angular acceleration meter, the acceleration meter, the angular velocity meter, the velocity meter, the angular displacement meter, the displacement meter, and any other meters that can detect the fluctuation, including method for detecting the fluctuation of the image itself or the like.

In the present invention the vibration detecting means and correction means can be set in split arrangement in a plurality of devices mountable to each other, for example in a camera and in an interchangeable lens mountable thereto.

In the present invention the components in the claims or the embodiments or some components may be set in separate apparatus. An example may be such that the vibration detecting means is set in the camera body, the correction means in the lens barrel mounted to the camera, and the control means for controlling them in an intermediate adapter.

The present invention was described with the examples of applications to the cameras including the single-lens reflex camera, the lens shutter camera, the video camera, and so on, but the invention can also be applied to the other optical equipment, the other apparatus, and applications as a constituent unit.

As explained above, the embodiments of the present invention as described above are arranged in such a manner that the limiting portion receives the couple occurring because of the positional relation of the center of gravity of the correction means so as to prevent the correction means from inclining (relative to the direction perpendicular to the optical axis) due to the couple.

This can maintain the optical performance without change when the image blur prevention is either on or off.

According to the present invention, the embodiments are provided with the pinching means for pinching the correction means so as to be slidable in the direction perpendicular to the optical axis, and the correction means is urged toward the object side of the optical axis by the pinching means.

This arrangement can prevent the degraudation of image blur prevention control when the elastic means is deflected upon carrying of the apparatus or with application of impact so as to move the correction means down, and if upon use of the apparatus, the correction means cannot perfectly return to the original position depending upon the urging force of the elastic means, and such setting that the urging force of the elastic means is set weak enough to allow the correction means to slide smoothly during the image blur prevention control.

Third Embodiment

Figure 10:
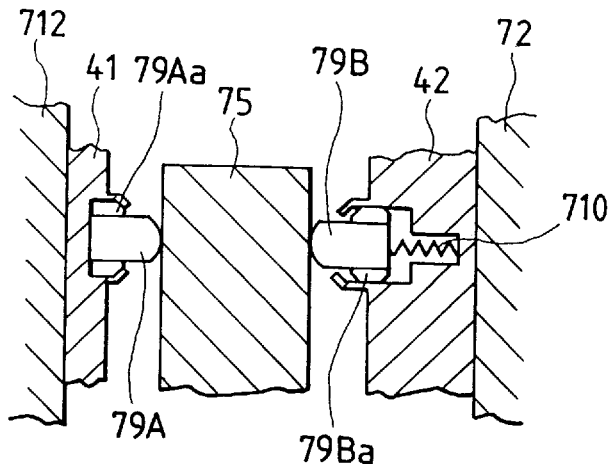
FIG. 10 is a sectional view to show the structure of the pinching means in the third embodiment of the present invention.

FIG. 10 is a sectional view to show the major part of the correction optical apparatus according to the third embodiment of the present invention, which is different from the above first embodiment in that the support balls 79A, 79B and charge springs 710 being the pinching means are provided on the base plate side.

In FIG. 10, a plastic support member 41 or 42 is fixed on the first yoke 712 or on the second yoke 72, respectively, and each support ball 79A, 79B is set by calking in the support member 41, 42, respectively. Since the receiving surface for the bottom of the support ball 79B is deep, the support ball 79B is movable toward the receiving surface. In contrast, the support ball 79A is fixed relative to the support member 41. The support ball 79A may be formed integrally with the support member 41 by making the support member 41 itself of POM. The support frame is supported as pinched between the support balls 79A, 79B.

Since the charge springs 710 can also be preliminarily set in the charged state in the above arrangement, the workability is improved in incorporating the support frame 75.

Fourth Embodiment

Figure 11:
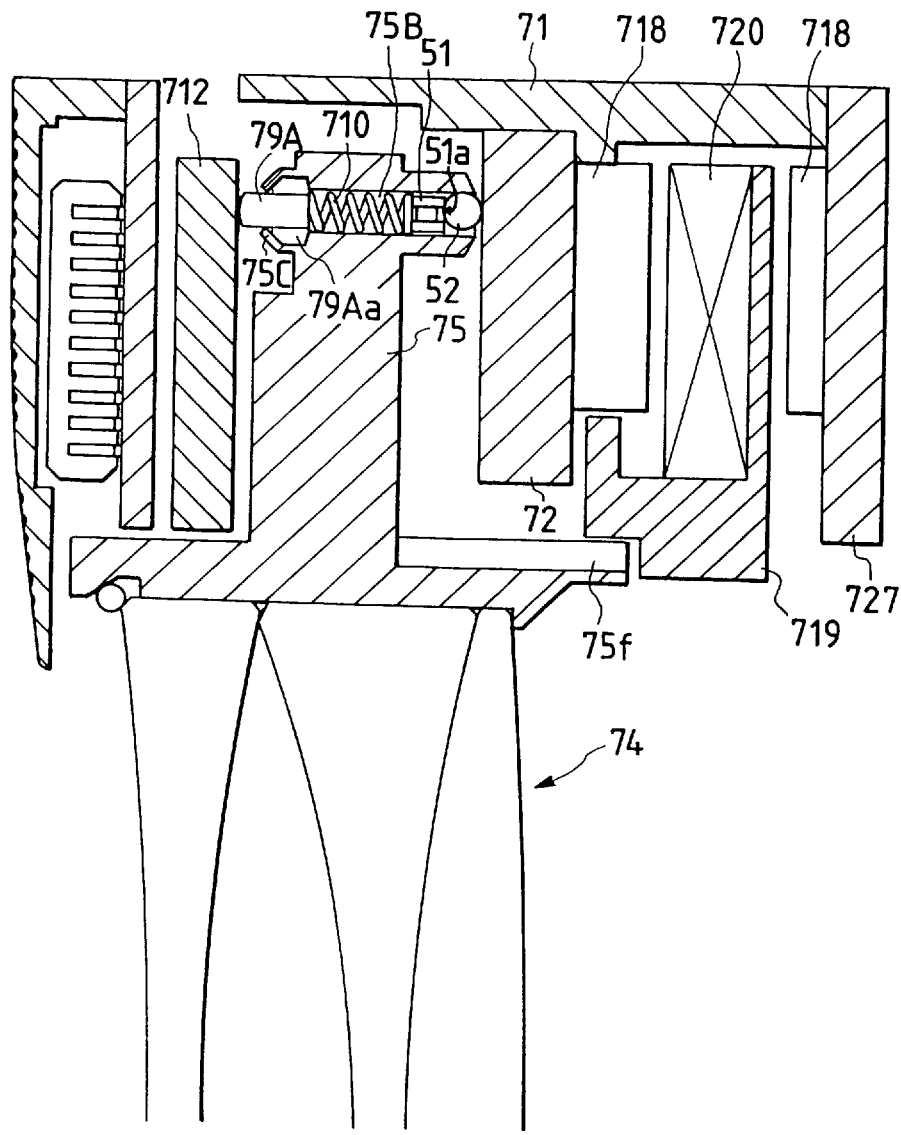
FIG. 11 is a sectional view to show the structure of the pinching means in the fourth embodiment of the present invention.

FIG. 11 is a sectional view to show the major part of the correction optical apparatus according to the fourth embodiment of the present invention, which is different from above FIG. 3 (the first embodiment) in that the support ball 79B is composed of two components, a support ball stop 51 and a ball 52 to be a new support ball.

Since the support ball stop 51 is also incorporated into the support frame 75 in the same manner as the support ball 79B was, the charge spring 710 is set in the charge state after the support ball 75A is pressed into the support frame 75 and the support frame 75 is thermally calked.

The ball 52 is set in a recess portion composed of the internal peripheral wall of the hole 75B and a flat surface portion 51a of the support ball stop 51 and is fixed therein with a lubricant filling the recess portion. Thus, the ball 52 is also prevented from slipping off from the support frame 75.

The above arrangement has the following advantages.

FIG. 12 is a drawing to show a state in which in use of the pinching means of above FIG. 3 the support frame 75 is sliding in the direction of arrow 713p. The support ball 79B is in contact with the second yoke 72 and shows a delay of sliding only at the contact surface because of the occurrence of some friction during relative sliding movement. Therefore, there occurs a scrape (at arrows 61, 62) between the support ball 79B and the internal peripheral wall of the hole 75B, as shown in FIG. 12. Since the scrape makes the spring property of the charge spring 710 ineffective, it gives a thrust between the first yoke 712 and the second yoke 72 to be a load against sliding of the support frame 75.

However, in the case of the ball 52 of the support ball in contact with the first yoke 712 as in the configuration of FIG. 11, there occurs no scrape to the hole 75B because of the configuration, and thus, no sliding load due to the scrape appears.

The contact surface of the support ball stop 51 with the ball 52 is a flat surface parallel to the pinching surface of the second yoke 72. The reason is as follows. If the contact surface of the support ball stop 51 with the ball 52 were a concave surface matching with the configuration of the ball 52, the support ball stop 51 would also move with rotation or the like of the ball 52 during sliding thereof, which could cause the scrape on the support ball stop 51 and the internal peripheral wall of the hole 75B. In order to avoid it, the contact surface of the support ball stop 51 with the ball 52 is formed as a flat surface so as to be independent of the motion of the ball 52.

Fifth Embodiment

FIG. 13 is a sectional view to show the major part of the correction optical apparatus according to the fifth embodiment of the present invention, in which the support ball 79B in above FIG. 10 (the third embodiment) is comprised of the two components, the support ball stop 51 and ball 52, similarly as in FIG. 11 (the third embodiment).

Therefore, the possibility of the scrape occurring with the support ball 75B in FIG. 10, similarly as in FIG. 12, can be prevented by the ball 52.

The above embodiments have the following advantages.

(1) The assembling workability is improved because the charge springs can be preliminarily set in the charge state on the side of the support frame or the first and second yokes.

(2) The degradation of sliding due to the scrape is overcome by the arrangement in which the support ball is composed of the two components of the support ball stop 51 (with the charge spring for setting in the charge state) and the ball 52.

(3) The contact surface of the support ball stop 51 with the ball 52 is flat, so that the force applied to them (the force in the charge direction of the charge spring on the support ball stop 51 and the force in the sliding direction on the ball 52) can be separated. This causes no scrape on the support ball stop 51 and can prevent degradation of sliding accuracy.

(4) The member having the narrower contact point, such as the support ball 79A, is softer than the member having a wide surface, such as the pinching surface, which can prevent degradation of sliding property due to impact.

(5) With the application of impact or the like, the support ball moves down against the spring force to bring the pinched surface into contact with the receiving surface over a wide area, which makes the formation of a gouge rare.

It is a matter of course that the present invention is by no means limited to the structures of these embodiments, but any structure may be applied as long as it can achieve the functions stated in the claims or the functions owned by the embodiments.

In the present invention the vibration detecting means may be selected from an angular acceleration meter, an acceleration meter, the angular velocity meter, an velocity meter, an angular displacement meter, a displacement meter, and any other meters that can detect the fluctuation, including the method for detecting the fluctuation of the image itself or the like.

In the present invention the vibration detecting means and correction means can be set in a split arrangement in a plurality of devices mountable to each other, for example in a camera and in an interchangeable lens mountable thereto.

In the present invention the components in the claims or the embodiments or some components may be set in separate apparatus. An example may be such that the vibration detecting means is set in the camera body, the correction means in the lens barrel mounted to the camera, and the control means for controlling them in an intermediate adapter.

The present invention was described with the examples of applications to cameras including a single-lens reflex camera, a lens shutter camera, a video camera, and so on, but the invention can also be applied to the other optical equipment, the other apparatus, and applications as a constituent unit.

As explained above, each of the first, and third to fifth embodiments of the present invention is arranged preliminarily to set the pinching means in the charged state in the movable frame or in the fixing member, whereby the assembling workability of the pinching means, in turn, of the apparatus, can be improved.

According to the present invention, since the portion of the pinching means sliding on the sliding surface against the charge force is made in the shape (ball) causing no scrape of the fitting portion during motion, the sliding property can be improved and the motion of the movable frame for holding the correction optical system can be smooth in the direction nearly perpendicular to the optical-axis direction.

In addition to the foregoing, the following points should be noted.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Further, the individual components shown in schematic or block form in the drawings are all well-known in the camera arts and their specific construction and operation are not critical to the operation or best mode for carrying out the invention.

Also, the present invention may involve all combinations of the above embodiments or the technical elements thereof with necessity.

What is claimed is:

1. An image blur prevention apparatus, comprising:

a first fixed member disposed on an object side of said apparatus in a direction of an optical axis:

a second fixed member disposed on an image plane side of said apparatus in the direction of the optical axis:

a movable optical member disposed between said first fixed member and said second fixed member and movable in a direction perpendicular to an axis of light to perform an image blur prevention operation, said movable optical member having a fixed contact portion contacting said first fixed member and a movable contact portion contacting said second fixed member; and an engaging member engageable with said movable optical member in an inverted pendulum support state at a position on an imaging plane side of said apparatus on the optical axis with respect to a center of gravity of said movable optical member.

2. An image blur prevention apparatus according to claim 1, wherein said fixed contact portion and movable contact portion are formed of a synthetic resin.

3. An image blur prevention apparatus according to claim 1, wherein said fixed contact portion is provided at a back side of said movable contact portion on the optical axis.

4. An image blur prevention apparatus according to claim 1, wherein said movable optical member includes a resilient member that biases said movable contact portion to abut against said second fixed member.

5. An image blur prevention apparatus, comprising:

a first fixed member disposed on an object side of said apparatus in the direction of an optical axis;

a second fixed member disposed on an image plane side of said apparatus in the direction of the optical axis;

a movable optical member disposed between said first fixed member and said second fixed member and in a direction perpendicular to an axis of light to perform an image blur prevention operation, said movable optical member having a fixed contact portion contacting said first fixed member and a movable contact portion contacting said second fixed member; and an engaging member engageable with said movable optical member in an inverted pendulum support state at a position on the object side of said apparatus on the optical axis with respect to a center of gravity of said movable optical member.

6. An image blur prevention apparatus according to claim 5, wherein said fixed contact portion and movable contact portion are formed of a synthetic resin.

7. An image blur prevention apparatus according to claim 5, wherein said fixed contact portion is provided at a back side of said movable contact portion on the optical axis.

8. An image blur prevention apparatus according to claim 5, wherein said movable optical member includes a resilient member that biases said movable contact portion to abut against said second fixed member.

9. An image blur prevention apparatus, comprising:

a first fixed member disposed on an object side of said apparatus in a direction of an optical axis;

a second fixed member disposed on an image plane side of said apparatus in the direction of the optical axis;

a movable optical member disposed between said first fixed member and said second fixed member and movable in a direction perpendicular to an axis of light to perform an image blur prevention operation, said movable optical member having a movable contact portion contacting said first fixed member and a fixed contact portion contacting said second fixed member; and an engaging member engageable with said movable optical member in a suspended support state at a position on the imaging plane side of said apparatus on the optical axis with respect to a center of gravity of said movable optical member.

10. An image blur prevention apparatus according to claim 9, wherein said movable portion and fixed contact portion are formed of a synthetic resin.

11. An image blur prevention apparatus according to claim 9, wherein said movable contact portion is provided at a back side of said fixed contact portion on the optical axis.

12. An image blur prevention apparatus according to claim 9, wherein said movable optical member includes a resilient member that biases said fixed contact portion to abut against said second fixed member.

13. An image blur prevention apparatus, comprising:

a first fixed member disposed on an object side of said apparatus in a direction of an optical axis;

a second fixed member disposed on an image plane side of said apparatus in the direction of the optical axis;

a movable optical member disposed between said first fixed member and said second fixed member and movable in a direction perpendicular to an axis of light for performing an image blur prevention operation, said movable optical member having a movable contact portion contacting said first fixed member and a fixed contact portion contacting said second fixed member; and an engaging member engageable with said movable optical member in a suspended support state at a position on an object side of said apparatus on the optical axis with respect to a center of gravity of said movable optical member.

14. An image blur prevention apparatus according to claim 13, wherein said movable contact portion and fixed contact portion are formed of a synthetic resin.

15. An image blur prevention apparatus according to claim 13, wherein said movable contact portion is provided at a back side of said fixed contact portion on the optical axis.

16. An image blur prevention apparatus according to claim 13, wherein said movable optical member includes a resilient member that biases said fixed contact portion to abut against said second fixed member.

17. An image blur prevention apparatus disposable along an optical axis between an object and an image plane, said image blur prevention apparatus comprising:

a first fixed member disposed on an object side of said apparatus in the direction of the optical axis;

a second fixed member disposed on an image plane side of said apparatus in the direction of the optical axis; and a movable optical member disposed between said first fixed member and said second fixed member and movable in a direction perpendicular to an axis of light to perform an image blur prevention operation, said movable optical member having a movable contact portion contacting said first fixed member and movable in a direction substantially parallel to the axis of light, and a fixed contact portion contacting said second fixed member.

18. An image blur prevention apparatus according to claim 17, wherein said movable contact portion and fixed contact portion are formed of a synthetic resin.

19. An image blur prevention apparatus according to claim 17, wherein said movable contact portion is provided at a back side of said fixed contact portion on the optical axis.

20. An image blur prevention apparatus according to claim 17, wherein said movable optical member includes a resilient member that biases said fixed contact portion to abut against said second fixed member.

21. An image blur prevention apparatus, comprising:

a first fixed member;

a second fixed member; and a movable optical member disposed between the first fixed member and the second fixed member and movable in a direction perpendicular to an axis of light to perform an image blur prevention operation, wherein said movable optical member includes a movable contact portion contacting said first fixed member and a fixed contact portion contacting said second fixed member, said movable contact portion including a ball contacting said first fixed member, an intermediate member contacting a point of said ball and an elastic member biasing said intermediate member to abut against said ball.

22. An image blur prevention apparatus according to claim 21, wherein said intermediate member is formed of a synthetic resin.

23. An image blur prevention apparatus, comprising:

a first fixed member;

a second fixed member;

a movable optical member disposed between said first fixed member and said second fixed member and movable in a direction perpendicular to an axis of light to perform an image blur prevention operation, said first fixed member having a movable contact portion contacting said movable optical member, said movable contact portion including a ball contacting said first fixed member, an intermediate member contacting a point of said ball and an elastic member biasing said intermediate member to abut against said ball.

24. An apparatus according to claim 23, wherein said intermediate member is made of synthetic resin.

* * * * *

UNITED STATES PATENT AND TRADEMARK OFFICE
CERTIFICATE OF CORRECTION

PATENT NO. : 6,035,131
DATED : March 7, 2000
INVENTOR(S) : Koichi Washisu

It is certified that error appears in the above-identified patent and that said Letters Patent is hereby corrected as shown below:

Abstract,
Line 1, delete ","; after "a" insert -- movable -- ; before "correction" insert -- (--;
Line 2, after "system" insert -- ) -- ; after "blur" insert -- , -- ; after "a" insert -- regulating portion ( --;
Line 3, after "system" insert -- ) -- ; after "the" (second occurrence) insert -- movable member to a non-movable state --; and
Line 4, delete "collection optical system immobile".

Sheet 1,
Fig. 1, Replace label "Fig. 1" with labels Fig. 1A, Fig. 1B, and Fig. 1C (see attached).

Figure 14:
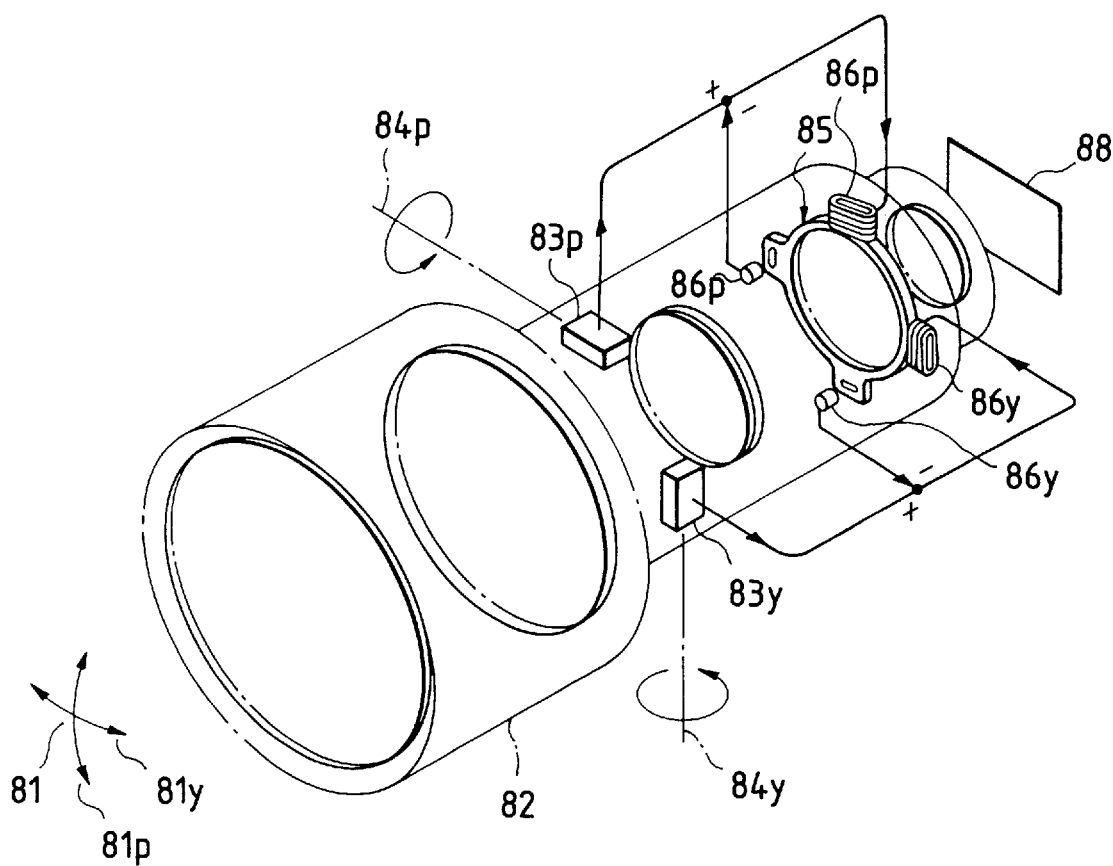
FIG. 14 is a perspective view to show the schematic structure of the conventional image blur prevention system.

Sheet 11,
Fig. 14, Replace Fig. 14 with the attached Fig. 14.

Sheet 12,
Fig. 15, Replace label "Fig. 15" with labels Fig. 15A, Fig. 15B, and Fig. 15C (see attached).

Column 1,
Line 60, "donote" should read -- denote --.

Column 2,
Line 5, "Fig. 15 is" should read -- Fig. 15A, 15B, and 15C represent --.
Line 23, "forcibly" should read -- after being forcibly --.

Column 3,
Line 57, "ground" should read -- earth (GND: ground) --.
Line 59, "a rounded" should read -- grounded --.
Line 66, "Fig. 15" should read -- Fig. 15A --.

Column 4,
Line 19, "such conventional bayonet coupling that" should read -- a conventional bayonet coupling so that --.

Column 5,
Line 53, "the Fleming's" should read -- Fleming's --.

UNITED STATES PATENT AND TRADEMARK OFFICE
CERTIFICATE OF CORRECTION

PATENT NO. : 6,035,131
DATED : March 7, 2000
INVENTOR(S) : Koichi Washisu

It is certified that error appears in the above-identified patent and that said Letters Patent is hereby corrected as shown below:

Column 6,
Line 4, "as" should be deleted.
Line 8, "loyally" should read -- faithfully --.
Line 56, "or the" should read -- or the like --.

Column 7,
Line 47, "this" should read -- this, --.

Column 10,
Line 35, "self-weight" should read -- weight --.
Line 40, "self-weight" should read -- weight --.
Line 43, "self-weight" should read -- weight --.

Column 11,
Line 7, "unlocking" next." should read -- an unlocking operation. --.
Line 19, "in" should be deleted.
Line 21, "in" should be deleted.
Line 35, "Fig. 1 is" should read -- Figs. 1A, 1B, and 1C represent --.

Column 12,
Line 8, "Fig. 15 is" should read -- Figs. 15A, 15B, and 15C represent --.
Line 54, "after" should read -- after being --.
Line 64, "in" should read -- this embodiment in --.

Column 13,
Line 32, "works," should be deleted.

Column 14,
Line 30, "self-weights" should read -- weights --.
Line 34, "becomes" should read -- become --.
Line 48, "as" should read -- while --.

Column 16,
Line 1, "case, the" should read -- case, a large coupling force --.
Line 2, "great couple" should be deleted.
Line 4, "Similarly, the" should read -- Similarly, a large coupling force --.
Line 5, "great couple" should be deleted.
Line 7, "the great couple" should read -- a large coupling force --.

UNITED STATES PATENT AND TRADEMARK OFFICE
CERTIFICATE OF CORRECTION

PATENT NO. : 6,035,131
DATED : March 7, 2000
INVENTOR(S) : Koichi Washisu

It is certified that error appears in the above-identified patent and that said Letters Patent is hereby corrected as shown below:

Column 17,
Line 49, "method" should read -- a method --.

Column 20,
Line 6, "the" should read -- an -- ; and "an" should read -- a --.
Line 8, "the" should read -- a --.

Column 21,
Line 33, "and in" should read -- and movable in --.
Line 36, "fixed" should read -- movable --.
Line 37, "movable" should read -- fixed --.
Line 53, "second" should read -- first --.

Column 22,
Line 6, "movable" should read -- movable contact --.
Line 13, "fixed" should read -- movable --.
Line 14, "second" should read -- first --.
Line 24, "movable" should read -- fixed --.
Line 25, "fixed" should read -- movable --.
Line 42, "fixed" should read -- movable --.

Column 23,
Line 3, "fixed" should read -- movable --.
Line 4, "second should read -- first --.

Claims,

Column 24, claims 25 to 29,
Line 17,
25. An image blur prevention apparatus disposable along an optical axis between an object and an image plane, said image blur prevention apparatus comprising:
a first fixed member disposed on an object side of said apparatus in the direction of the optical axis;
a second fixed member disposed on an image plane side of said apparatus in the direction of the optical axis; and

UNITED STATES PATENT AND TRADEMARK OFFICE
CERTIFICATE OF CORRECTION

PATENT NO. : 6,035,131
DATED : March 7, 2000
INVENTOR(S) : Koichi Washisu

It is certified that error appears in the above-identified patent and that said Letters Patent is hereby corrected as shown below:

a movable optical member disposed between said first fixed member and said second fixed member and movable in a direction perpendicular to an axis of light to perform an image blur prevention operation, said movable optical member having a movable contact portion contacting said second fixed member and movable in a direction substantially parallel to the axis of light, and a fixed contact portion contacting said first fixed member.

38. An image blur prevention apparatus according to Claim 37, wherein said movable contact portion and fixed contact portion are formed of a synthetic resin.

39. An image blur prevention apparatus according to Claim 37, wherein said movable contact portion is provided at a back side of said fixed contact portion on the optical axis.

40. An image blur prevention apparatus according to Claim 37, wherein said movable optical member includes a resilient member that biases said movable contact portion to abut against said second fixed member.

41. An image blur prevention apparatus, comprising:
a first fixed member disposed on an object side of said apparatus in the direction of an optical axis.
a second fixed member disposed on an image plane side of said apparatus in the direction of the optical axis;
a movable optical member disposed between said first fixed member and said second fixed member and movable in a direction perpendicular to an axis of light to perform an image blur prevention operation, said movable optical member having a movable contact portion contacting said first fixed member and a fixed contact portion contacting said second fixed member;

UNITED STATES PATENT AND TRADEMARK OFFICE
CERTIFICATE OF CORRECTION

PATENT NO. : 6,035,131
DATED : March 7, 2000
INVENTOR(S) : Koichi Washisu

It is certified that error appears in the above-identified patent and that said Letters Patent is hereby corrected as shown below:

an engaging member engageable with said movable optical member in a cantilever support state at a position on the object side or the image plane side of said apparatus on the optical axis with respect to a center of gravity of said movable optical member, wherein said engaging member engages said movable optical member at a predetermined location that stabilizes optical performance of said movable optical member. --

Signed and Sealed this

Twenty-seventh Day of November, 2001

Attest:

*Attesting Officer*

NICHOLAS P. GODICI
*Acting Director of the United States Patent and Trademark Office*